United States Patent [19]
Boswell

[11] Patent Number: 6,016,655
[45] Date of Patent: *Jan. 25, 2000

[54] APPARATUS FOR IMPROVING INTAKE CHARGE VAPORIZATION AND INDUCTION FOR AN INTERNAL COMBUSTION ENGINE

[76] Inventor: George A. Boswell, 806 Burnett, Eagle River, Wis. 54521

[*] Notice: This patent issued on a continued prosecution application filed under 37 CFR 1.53(d), and is subject to the twenty year patent term provisions of 35 U.S.C. 154(a)(2).

[21] Appl. No.: 08/920,520

[22] Filed: Aug. 29, 1997

Related U.S. Application Data

[62] Division of application No. 08/568,696, Dec. 7, 1995, Pat. No. 5,662,077.

[51] Int. Cl.⁷ .................................................. F01M 7/00
[52] U.S. Cl. ................................................................. 60/324
[58] Field of Search .......................... 60/324; 415/57.1, 415/58.1, 58.2, 58.3, 143, 914

[56] References Cited

U.S. PATENT DOCUMENTS

| | | | |
|---|---|---|---|
| 2,206,193 | 7/1940 | Kadenacy | 60/324 |
| 2,709,917 | 6/1955 | Bruynes | 415/914 |
| 2,892,582 | 6/1959 | O'Rourke | 415/914 |
| 2,910,830 | 11/1959 | White | 60/324 |
| 3,216,455 | 11/1965 | Cornell et al. | 415/914 |
| 4,930,979 | 6/1990 | Fisher et al. | 415/58.4 |
| 5,246,335 | 9/1993 | Mitsubori et al. | 415/58.3 |
| 5,662,077 | 9/1997 | Boswell | 123/184.21 |

*Primary Examiner*—John Kwon
*Attorney, Agent, or Firm*—Haverstock, Garrett & Roberts

[57] ABSTRACT

Apparatus for improving the vaporization of the intake charge for an internal combustion engine and for improving the induction or aspiration of the intake charge through the intake tract or passages of the an engine by generating suction from the intake charge flow through the intake tract and utilizing energy from back pressure and/or reverse pressure pulses flowing in the opposite direction in the intake tract to draw poorly or inadequately atomized or vaporized elements of the intake charge, raw fuel, and a condition known as "reversion" from the intake tract into the apparatus, mix the collected elements, and discharge them back into the intake tract in a vaporized state to thereby improve the overall vaporization of the intake charge and reduce back pressure, reverse pulses, and the resultant reversion that can adversely affect induction as well as intake charge quality. The present invention also has utility in the exhaust tract or passages of an engine to capture and redirect exhaust generated back pressure back into to the exiting exhaust flow stream to prevent the back pressure from traveling on to the intake tract and contaminating the intake charge and interfering with induction, while also improving exhaust emissions and other parameters. Apparatus according to the present invention can be utilized at various locations in both the intake and exhaust tracts to operate in cooperation to provide enhanced induction flow throughout both tracts.

5 Claims, 13 Drawing Sheets

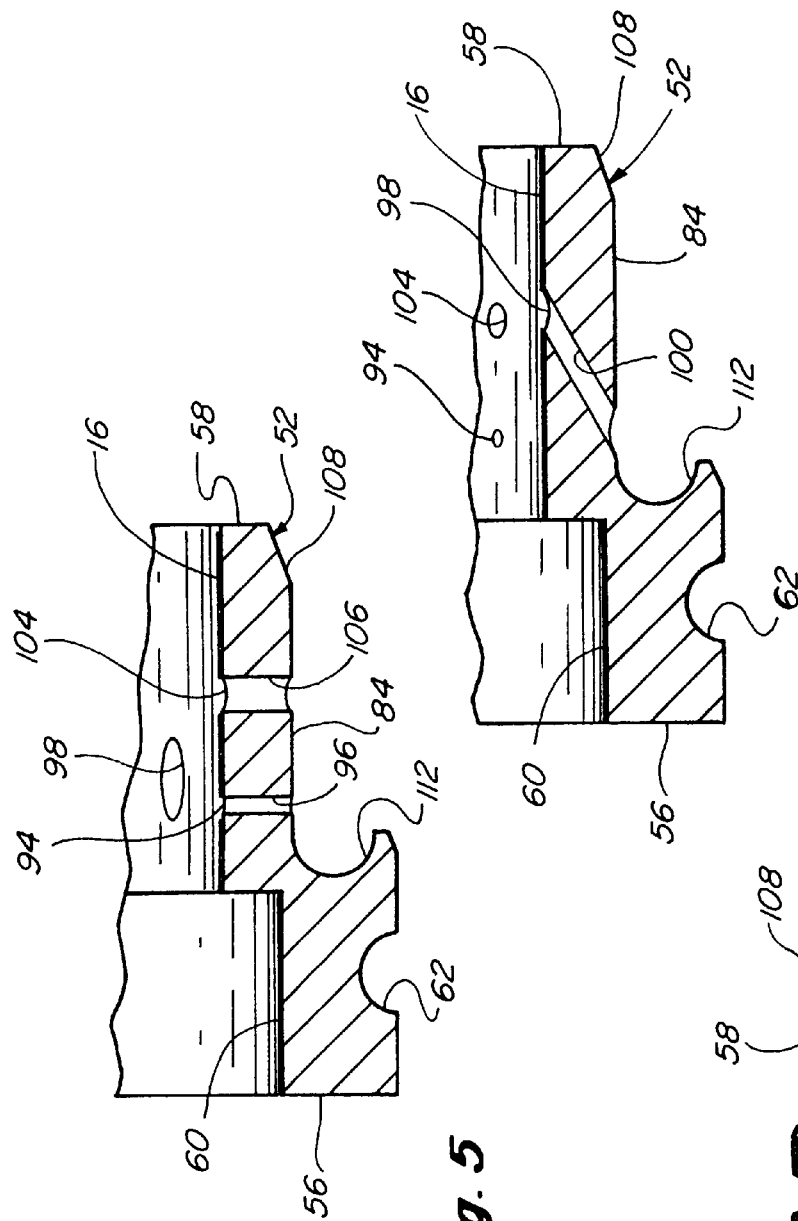

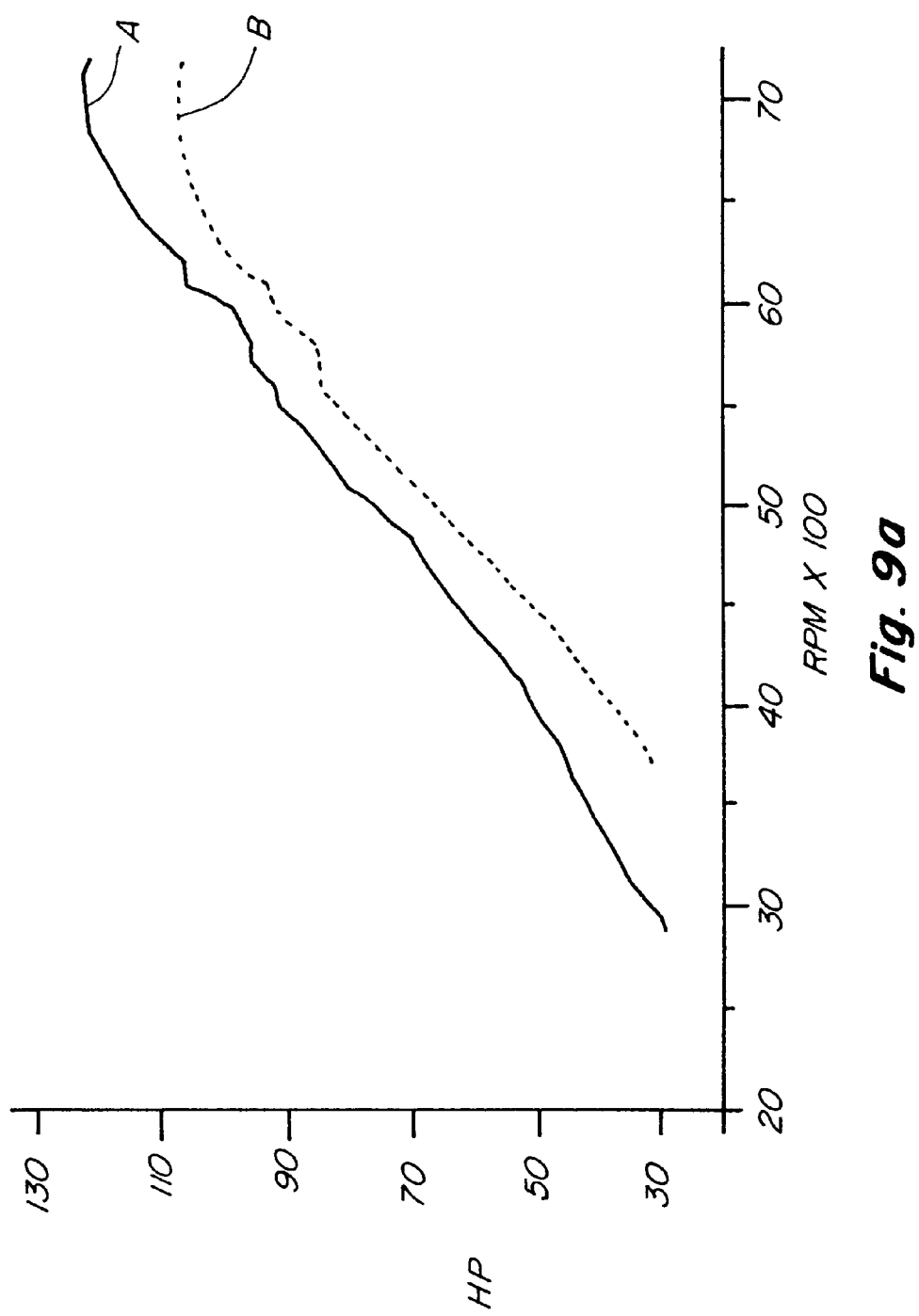

APPARATUS FOR IMPROVING INTAKE CHARGE VAPORIZATION AND INDUCTION FOR AN INTERNAL COMBUSTION ENGINE

This application is a division of Ser. No. 08/568,696, filed Dec. 7, 1995, now U.S. Pat. No. 5,662,877.

The present invention relates generally to devices for improving the vaporization of the intake charge for an internal combustion engine and for improving the induction or aspiration of the intake charge through the intake tract or passages of an engine. More particularly, the present invention relates to apparatus for generating suction from the intake charge flow through the intake tract, and for utilizing energy from back pressure and/or reverse pressure pulses flowing in the opposite direction in the intake tract, to draw poorly or inadequately atomized or vaporized elements of the intake charge, raw fuel, and a condition known as "reversion" from the intake tract into the apparatus, mix the collected elements, and discharge them back into the intake tract in a vaporized state to thereby improve the overall vaporization of the intake charge and reduce back pressure, reverse pulses, and the resultant reversion that can adversely affect induction as well as intake charge quality. The present invention also has utility in the exhaust tract or passages of an engine to capture and redirect exhaust generated back pressure back into to the exiting exhaust flow stream to prevent the back pressure from traveling on to the intake tract and contaminating the intake charge and interfering with induction, while also improving exhaust emissions and other parameters. Apparatus according to the present invention can be utilized at various locations in both the intake and exhaust tracts to operate in cooperation to provide enhanced induction flow throughout both tracts.

BACKGROUND OF THE INVENTION

A poorly formed fuel/air intake charge, including inadequately atomized or vaporized fuel, and the resultant presence of raw fuel in the intake tract extending from the intake charge forming device to the combustion chamber, as well as back pressure and its resultant reversion, explained more fully below, are well known conditions that adversely affect induction and combustion in virtually every type of internal combustion engine utilizing virtually all known kinds of charge forming or fuel/air mixing devices, including carburetors, fuel injectors, and hybrids of the two. Such conditions occur under even ideal operating conditions, with a poorly or inadequately formed intake charge and raw or liquid fuel in the intake tract being particularly problematic during cold starts, rapid or sudden throttle changes and the like. Poor charge formation is aggravated by malfunctioning, dirty, or improperly set-up or adjusted charge forming devices, as well as other problems such as vacuum leaks and faulty emissions control devices. The resultant raw fuel tends to collect in low spots in the intake tract where it can evaporate, but can also travel on to the combustion chamber. An inadequately atomized or vaporized fuel charge, along with raw fuel that reaches the combustion chamber, can cause poor combustion, engine response, power, and economy, as well as spark plug and valve fouling, dirty exhaust emissions and other problems. Back pressure and reversion primarily disrupt induction, which is the aspiration of the intake charge into and through the intake tract, and therefore the delivery of the proper mix of fuel and air to the combustion chamber responsive to changes in throttle and power demand.

Numerous devices have been utilized over the years to address mostly individually the problems of improper intake charge atomization and/or vaporization, raw fuel in the intake tract, and back pressure and/or reversion. Reference for instance, U.S. Pat. No. 4,381,756, which discloses a gasoline economizing attachment device that can be mounted between a carburetor and intake manifold of an internal combustion engine to vaporize uncarbureted fuel in the intake tract. This device includes an annular upstream facing chamber or recess for collecting uncarbureted fuel at the exit port of the carburetor, and an external vaporizing system which utilizes the pressure differential between the intake manifold vacuum and an outside source of air, presumably the atmosphere, to vaporize the collected fuel and return it to the manifold. Shortcomings of this construction, however, include that it does not significantly improve overall intake charge vaporization, nor does it address the problem of back pressure and reversion and their effects on induction. Also, the device restricts air flow through the intake tract to at least some degree, it is relatively complex, and requires an outside air source to effect vaporization of the fuel.

Other examples of known devices for improving fuel atomization and vaporization are disclosed in U.S. Pat. Nos. 4,295,458; 4,452,219; 4,974,573; 3,747,581; and 4,672,940. Each of these devices utilize some type of perforated structure, such as a mesh or a screen member, through which the intake charge is directed to improve fuel atomization, the latter two devices utilizing heat to vaporize the fuel. Shortcomings of all of these devices include the flow restrictiveness of the screen or other perforated member, and with regard to the latter two devices, the requirement of heat to vaporize the fuel. Vaporizing the fuel using heat is considered a shortcoming because a heated fuel charge has been found to be less dense and thus less powerful when combusted, and makes it more difficult to achieve higher levels of volumetric efficiency. The means required to heat the fuel also adds complexity and expense. Further, if too hot, fuel vapor in the intake tract can lead to the condition commonly known as vapor lock which is a condition that partially or completely blocks the flow of fuel into the intake charge path. To avoid vapor lock, some of the prior devices heat the fuel only during engine warm-up and are turned off when the engine reaches its operating temperature. However, an obvious shortcoming with those devices is that they provide less benefit when unheated. These constructions also do nothing to significantly address back pressure and reversion.

Reference U.S. Pat. Nos. 3,458,297; 3,847,125; 4,058,102; and 5,392,752, which disclose various known devices for removing raw fuel from the intake passages of internal combustion engines. Each of these devices utilize some type of cup or other member to collect the liquid fuel as it travels through the intake passage, and means to mix the collected fuel into the intake charge so that the fuel can be carried by the charge flow to the combustion chamber. Reference in particular U.S. Pat. No. 3,458,297, which discloses several embodiments of a ring shaped body member that mounts in an intake passage and forms an annular recess therearound for collecting fuel along the intake passage wall. A plurality of projections are located at spaced intervals around the central opening through the member, and a plurality of radial passageways extend through the member to carry the collected fuel from the annular recess to the projections. Each projection includes a chisel shaped drip edge for receiving the fuel such that the intake charge can flow over the drip edges, pick up the fuel, and carry it to the combustion chamber. U.S. Pat. No. 3,458,297 also discloses one embodiment that utilizes exhaust heat of the engine to vaporize the fuel to facilitate pick up by the intake flow. However, neither this or the other identified devices effect improved overall intake charge vaporization or address the problem of back pressure and reversion, and all restrict intake flow at least to some extent.

Reversion, as noted above, is the result of back pressure and can be more particularly described as the reverse or back flow of a portion of the intake charge through an intake tract of an engine as a result of a pattern or series of reverse or upstream traveling shock waves or pulses that enter the intake tract when the intake valve or other means controlling the flow of the intake charge into the combustion chamber is open. These shock waves or pulses are the result of the high pressure developed by combustion in the combustion chamber, and also back pressure from the exhaust, both of which can be transmitted to the intake tract through the open intake valve to contaminate the intake charge. Such upstream or back flowing pulses and back pressure have been observed to move mainly through the stagnant or dead spaces in the intake tract where the intake flow has little or no velocity, and more importantly, along the wall of the intake tract in essentially the boundary layer of the intake charge flow stream. The upstream traveling pulses and back pressure cause some of the adjacent downstream traveling intake charge flow to be slowed, stalled, or even reversed, the latter instance constituting reversion. The upstream traveling pulses and back pressure tend to decrease or dilute intake vacuum signal somewhat, which is a measure in terms of negative pressure or partial vacuum of the suction at a particular location in the intake tract from the intake stroke of the engine. A decreased vacuum signal represents a corresponding drop in induction as well as a resultant loss in engine responsiveness and smoothness.

Reversion and back pressure, sometimes referred to hereinafter as just reversion, are usually more problematic in two stroke internal combustion engines of all types, including those utilizing piston porting, conventional valves, reed valves, and also rotary valves for controlling communication between the intake tract and combustion chamber. This is for several reasons, namely, because two stroke engines operate at higher speeds than four stroke engines, and because two stroke engines lack a separate intake stroke compared to four stroke engines, the intake valve is open more frequently than in a four stroke engine. Reversion is also a problem in both two and four stroke engines having a substantial valve overlap condition, that is, wherein the intake valve is open simultaneously with the exhaust valve, and in virtually any engine when operating under heavy load conditions such as while powering a vehicle in a climb. Reversion has been found to be so great in some engines, particularly two stroke engines, that the engines won't operate without means to reduce or contain the reversion. Known constructions effective for reducing or containing reversion include devices known as reversion traps, usually located in the intake passage, and reversion tubes, usually located in the exhaust passage. Reversion traps generally include a restriction or neck in the exhaust passage upstream of a larger expansion area or chamber, which restriction or neck traps or limits the back flow of pressure and contaminants through the conduit. Reversion tubes operate generally the same as reversion traps, but in the intake passage. Shortcomings of both devices include that they do little or nothing to improve intake charge atomization and/or vaporization and do not recapture any of the energy of the reverse pulses or back pressure. Reversion traps are also limited in that although they reduce back pressure generated in the exhaust they do no limit that emanating from the combustion chamber. A further problem with reversion is that it can be hot, due to its origin in the combustion chamber and exhaust, and although hot reversion can facilitate vaporization of the fuel charge, it is a shortcoming for the reasons noted above with respect to hot fuel vapor.

Other known apparatus pertinent to a discussion regarding induction include the exhaust driven device called a turbocharger. A turbocharger generally comprises a pair of turbines mounted to a common shaft. One turbine is a drive turbine disposed in the exhaust flow path of an engine, while the other turbine is a compressor turbine disposed in the intake flow path between the charge forming or fuel/air mixing device and the combustion chamber. In operation, the exhaust gases expand across the exhaust turbine to rotate it and the intake turbine thereby compressing the intake charge and forcing induction. This compression permits an increase in the amount of the fuel introduced into each combustion chamber during the intake stroke, while maintaining a desired fuel/air ratio, to produce attendant increases in engine power output and volumetric efficiency. However, shortcomings associated with turbochargers include the heating of the intake charge due to compression thereof, which is a problem often remedied utilizing a device commonly called an intercooler. The purpose of an intercooler is to remove the heat generated as the intake charge is compressed so that the fuel mixture density is increased. However, shortcomings of intercooled turbochargers include added weight, complexity, and expense. Also, since turbochargers are driven by exhaust gases, when exhaust gas flow is low, such as when an engine is idling or under only light load, the turbocharger generally does not operate to compress the intake charge or facilitate induction. Turbochargers furthermore have slow response to demands for power increase and will consume excess fuel for a time whenever there is a significant increase in throttle opening. Still further, due to the location of the turbocharger drive turbine in the hot exhaust flow, turbochargers have been found more prone to heat related failures.

SUMMARY OF THE INVENTION

The present invention overcomes the shortcomings of the above described known prior art devices by teaching the construction and operation of apparatus that utilizes a circuit in communication with the intake tract of an internal combustion engine to generate suction from the intake charge flow and capture energy from reverse pulses or shock waves traveling in the tract to draw elements of the intake charge, raw fuel, and reversion present in the intake tract into the circuit, mix the elements therein, and discharge them from the circuit into the intake charge flow stream in a vaporized state to provide improved intake charge vaporization. Utilizing the present invention, the resultant improved intake charge vaporization is achieved without necessitating restricting the flow through the intake passage, heating the raw fuel, or using air from an outside source. The improved intake charge is also achieved without the complexity and attendant problems of devices such as turbochargers and the like. In the preferred embodiments of the invention, the vapor that is discharged into the intake charge flow stream is cool and dense. This cool, dense vapor has been found to substantially increase charge density and thus volumetric efficiency, resulting in measurably increased power. Spark plug fouling is also noticeably reduced. Additionally, better and more complete combustion of the intake charge has been achieved, with an exhaust product that is cleaner and cooler. The present invention has also been found to produce stronger induction and a steadier intake vacuum signal, both largely free of the limiting effects of reversion.

The present invention can be used in association with any charge forming or fuel/air mixing means such as, but not limited to, known carburetion, fuel injection or other fuel/air mixing devices. The circuit according to the present invention can take numerous forms, each including at least one orifice in communication with the intake passage for creating suction in the circuit, which orifice also serves as a discharge port for the circuit. The circuit includes at least one opening in communication with the intake passage, which opening serves as an inlet port the reversion and other elements, and at least one connecting passage communicating the one or more orifices with the one or more openings. The preferred location for each orifice is on or closely adjacent the side wall of the intake passage in position such that the intake charge flows thereover. This is to take advantage of the known principle that flow of a gas or other fluid over an orifice located on or closely adjacent a surface will generate suction in the orifice towards the flow. This suction will be sometimes referred to herein as a negative pressure or a partial vacuum condition. The amount of suction or negative pressure created is known to depend largely on flow velocity among other factors. During the course of development of the present invention, however, it was found that the amount of suction created could be influenced by the location, size, and shape of an orifice, as well as the orientation of the connecting passage, and that with the careful selection of those parameters for a particular application, a relatively strong suction, that is, a low negative pressure condition or a high vacuum condition, could be created in the orifice, even at lower intake flow velocities. Further, it was found that a suction sufficient for the purposes of the present invention could be generated in the circuit without a restriction in the intake passage, although a restriction could still be used when desired.

The present invention takes advantage of the above principles and discoveries to create a suction or negative pressure or partial vacuum condition in the one or more orifices of the circuit, which condition is communicated through the connecting passage or passages to the one or more openings or intake ports. In this regard, it should be noted that each opening or intake port should be located or oriented differently than the orifices, such that little or no suction or negative pressure is generated in the opening or intake port itself which would counteract that communicated thereto by the circuit. This enables the suction communicated to the opening or intake port to draw portions or elements of the intake charge flow into the circuit through the opening or port, along with raw fuel that may be present in the vicinity of the opening. In the circuit, the intake charge and fuel will be mixed as they travel towards the one or more orifices, and will exit the circuit through the orifice or orifices at high velocity, usually with at least some degree of vaporization of the exiting mixture being achieved. Importantly, it was found that when an opening or intake port of the circuit is positioned in the intake passage in the path of reversion traveling upstream therein, the reversion will naturally enter the opening and will provide what can be described as a "ram" effect to drive the elements through the circuit to such an extent that the resultant flow velocity through the circuit and and exiting vaporization is greatly improved. In this regard, it was found that positioning the opening or openings in a downstream facing orientation adjacent the intake passage side wall so as to be located in the mostly likely or predictable path of the reversion as explained above provides the most advantageous ram effect. A single, downstream facing opening extending around the intake passage wall is preferred, although it should be recognized that other shaped and facing openings may have utility for different applications, as pointed out next.

A circuit constructed according to the present invention can include a wide variety of orifice and opening combinations, at a wide variety of locations around and along the length of the intake passage, to provide a desired mixture of flow generated suction and reversion driven flow through the circuit to suit a particular application. For instance, combinations can include a single orifice in communication with a single opening; a single orifice in communication with a plurality of openings; or a plurality of orifices in communication with a single opening. This latter arrangement, utilizing a plurality of orifices positioned at spaced locations around an intake passage, has been found to work well in combination with the preferred single opening extending around the intake passage at a downstream location, one observed benefit being that the orifices can be positioned in opposing relation around the intake passage such that discharge from the respective orifices will collide and mix in the intake passage, thereby making the intake charge flow more turbulent and the fuel component thereof less likely to reliquefy. Also, this arrangement allows the reversion to flow through the circuit in its natural, upstream direction, until redirected and discharged from the orifices into the intake charge flow stream, which takes the greatest advantage of the upstream directed energy of the reversion.

Regarding location, it has been found that for longer intake passage lengths, locating the circuit closer to the combustion chamber takes the greatest advantage of reversion, as reversion is generally stronger there, although other more upstream locations can still be used. For shorter intake passage lengths, no location is preferred, although, again, a location closer to the combustion chamber will likely take the greatest advantage of reversion.

Any number of independent or cooperating circuits according to the present invention can be provided. For instance, one preferred multiple circuit arrangement provides one or more circuits at an upstream location, which circuits are directed more to intake induced flow, and one or more circuits at a more downstream location, which downstream circuits are directed more to reversion induced flow. The circuits are independent, but cooperate. That is, some of the output of the upstream circuit or circuits will be drawn into and through the downstream circuit or circuits, providing what can be described as a kind of compounding effect. Further, it has been found that upstream circuits can be placed just downstream of or in the outlet of the charge forming device and will generate induction extending relatively far upstream thereof, even through and beyond the charge forming device into the inlet to the intake tract, and downstream circuits can be placed just upstream of the combustion chamber and will generate induction extending upstream into the upstream circuits, such that strong induction generated by apparatus constructed according to the present invention is present throughout the length of the intake tract. In another of the preferred embodiments, two independent circuits are "nested" together, that is, the orifices of one circuit are located upstream of the orifices of the other circuit, but the openings of the one circuit are located downstream of those of the other circuit. Circuits according to the present invention can also be located in overlapping, or side by side relation.

The circuitry according to the present invention can be incorporated into an intake passage in any suitable manner, for instance, by locating the circuitry in the outlet or downstream portion of a carburetor itself, locating it in an intake passage or manifold downstream of a carburetor, fuel injector, or the like, or locating it in a carburetor mounting boot or other structure through which the intake passage extends. The circuitry can be installed at either the time of initial manufacture or assembly of the intake structure, or later. In this regard, for motorcycles, snowmobiles, watercraft, and other small engine applications wherein the carburetor is typically mounted on the engine utilizing a flexible rubber boot, several preferred embodiments of the present invention are incorporated into the carburetor base and the boot without difficulty. According to several other preferred embodiments, devices constructed according to the present invention can be incorporated respectively into one or more of the individual intake passages known as runners leading to the combustion chambers of a multiple cylinder engine for cycling the intake charge flow through the different runners separately. Also, according to another preferred embodiment, the present invention is incorporated into an intake passage of a fuel injected engine downstream of a fuel injector nozzle for vaporizing the atomized fuel as it is discharged from the nozzle.

The circuitry according to the present invention also has utility in the exhaust tract or passages of an engine, both alone and with circuitry in the intake tract. In this regard, it should be recalled that reversion in the intake passage or passages results from two sources, escaping compression from the combustion chamber, and back pressure from the exhaust which can travel across the combustion chamber, both of which can enter the intake passage or passages through the open intake valve. The circuitry of the present invention can be utilized at one or more locations in an exhaust passage to capture back pressure directed in the upstream direction towards the combustion chamber to prevent the back pressure from traveling on to the intake tract where it can contaminate the intake charge and dilute induction as discussed above. Furthermore, the captured back pressure, along with flow induced suction generated in the circuit, will draw unburned fuel and other exhaust components into the circuit where they will be mixed and discharged back into the downstream directed exhaust flow stream. In this regard, particularly in two stroke engines, a relatively large amount of unburned fuel is typically exhausted. Also, at the exit from the combustion chamber, a flame will be present. Using the present circuitry placed close to the combustion chamber exit the discharge from the circuit can be directed into the exhaust flame so as to be more completely burned. The further combustion, as well as the suction generated by the circuitry, will create additional induction to draw combustion products into the exhaust tract from the combustion chamber. Still further, circuits placed at upstream and downstream locations in the exhaust tract can be used to provide strong induction throughout the exhaust tract in a similar manner as in the intake tract as explained above.

Other uses and applications for the teachings of the presents invention are also contemplated. For instance, circuits according to the present invention can be located in virtually any moving gas or vapor stream for cycling various components of the stream back into the stream in a more highly vaporized condition and also for counteracting the effects of back flow or back pressure in the stream.

OBJECTS OF THE PRESENT INVENTION

It is therefore an object of the present invention to improve the operation and performance of internal combustion engines.

Another object is to make internal combustion engines more efficient and reduce undesirable engine emissions.

Another object is to reduce the occurrence of spark plug fouling and other problems resulting from raw fuel and inadequate fuel atomization and vaporization in internal combustion engines.

Another object is to improve induction in internal combustion engines.

Another object is to increase the volumetric efficiency of internal combustion engines.

Another object is to provide means for returning raw fuel from the intake passages of internal combustion engines to the intake charge without significantly restricting flow through the intake passage or utilizing external apparatus.

Another object is to provide means for reducing reversion in internal combustion engines without significantly obstructing or restricting the induction flow to, or the exhaust flow from, the engine.

Another object is to cycle raw fuel in the intake passages of an internal combustion engine back into the intake charge flow stream in a vaporized state, mixed with portions of the intake charge and/or reversion.

Another object is to provide a vaporized intake charge for internal combustion engines that is cool.

Another object is to provide a vaporized intake charge for internal combustion engines that is dense.

Another object is to better vaporize fuel without heating the fuel.

Another object is to provide improved fuel vaporization means for internal combustion engines that is simple and inexpensive to make and which can be easily retrofitted into existing engines as well as incorporated into new engine designs.

Another object is to provide an alternate source of vacuum for various purposes associated with internal combustion engines.

These and other objects and advantages of the present invention will become apparent to those skilled in the art after considering the following detailed specification in conjunction with the accompanying drawings wherein:

BRIEF DESCRIPTION OF THE DRAWINGS

FIG. 5 is a fragmentary cross-sectional view of the annular body member taken along lines 5—5 of FIG. 4;

FIG. 6 is a fragmentary cross-sectional view of the annular body member taken along lines 6—6 of FIG. 4;

FIG. 7 is a fragmentary side elevational view of the annular body member of FIG. 2, showing optional serrations on the downstream end of the body member;

FIG. 9a is a graph comparing the horsepower output over crankshaft rpms of an internal combustion engine using the invention of FIGS. 2–8, and the same engine without the invention;

DETAILED DESCRIPTION OF THE PREFERRED EMBODIMENTS

Figure 1:
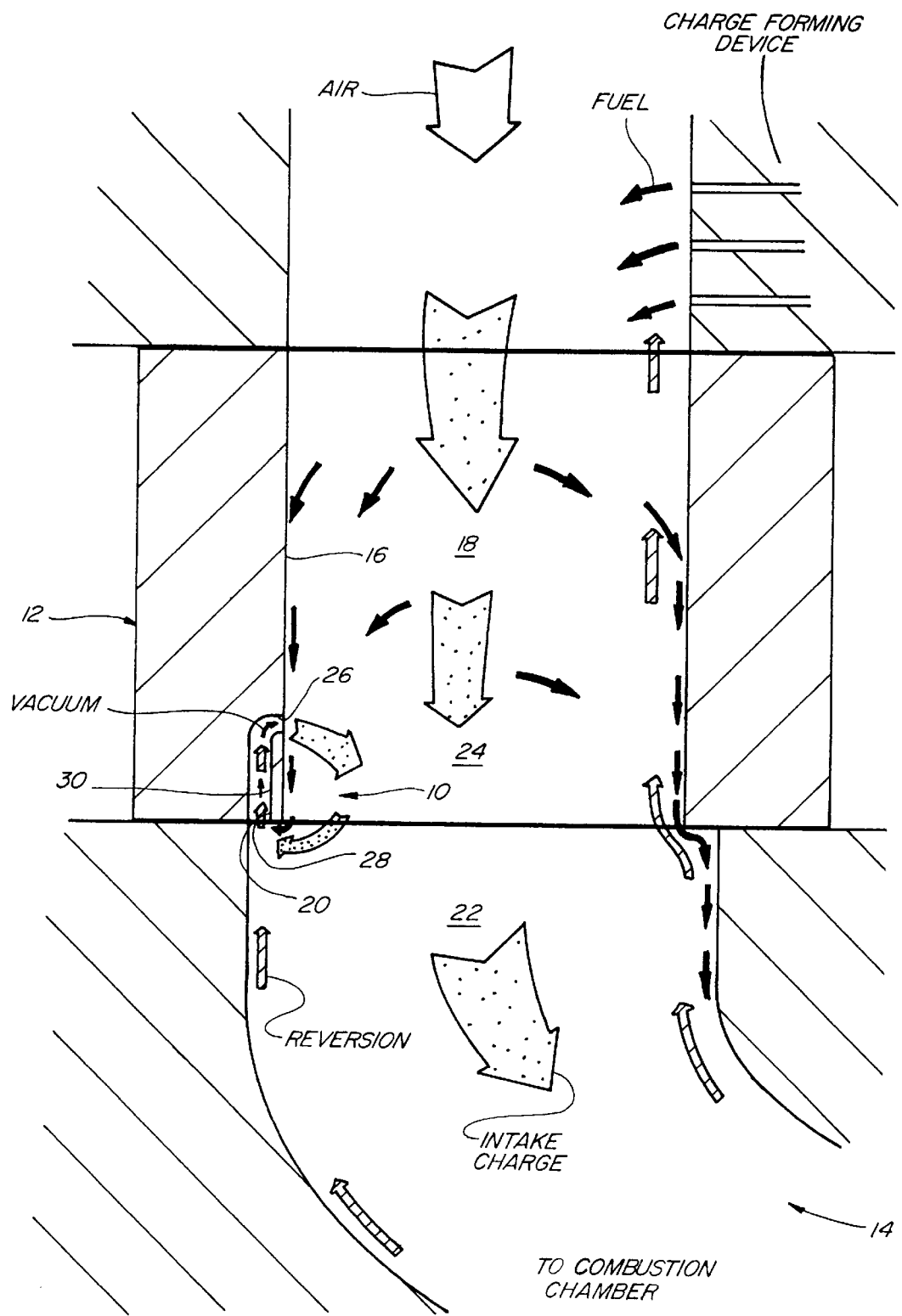
FIG. 1 is a cross-sectional representation of a circuit constructed according to the present invention for vaporizing the intake charge of an internal combustion engine, shown in association with a typical prior art engine intake tract, and showing in diagrammatic form the operation of the invention.

Referring to the drawings more particularly by reference numbers wherein like numerals refer to like parts, FIG. 1 is a diagrammatic representation showing the basic construction and operation of apparatus 10 according to the teaching of the present invention incorporated into an intake tract 12 of a typical prior art internal combustion engine 14. The intake tract 12 is representative of the intake tracts and passages of a wide variety of internal combustion engines including gasoline powered engines for vehicles such as automobiles, motorcycles, aircraft, watercraft, offroad sport vehicles, snowmobiles, and other internal combustion engine powered devices. The intake tract 12 is located intermediate a charge forming or fuel/air mixing device, such as a fuel injector or carburetor, and a combustion chamber of the engine, as shown. Note that for the purposes of the present invention, a charge forming device and a fuel/air mixing device are considered the same and thus these terms are used interchangeably herein. The intake tract 12 is typically of tubular, single or multiple piece construction, the latter being shown, and includes a side wall portion 16 defining an intake passage 18 for the flow of the intake charge from the charge forming or fuel/air mixing device to the combustion chamber. As explained elsewhere herein, an intake valve (not shown, but see item 83 in FIG. 2) is often located between the intake passage 18 and the combustion chamber to regulate flow of the intake charge into the combustion chamber, which flow is induced by the intake stroke of a piston (also not shown) located in the chamber. The intake charge, represented by the large, dotted arrows is a mixture of air (large white arrows) drawn into and through the charge forming or air fuel mixing device, and fuel (small, thick black arrows), the fuel being atomized, vaporized, or a mixture of both by the charge forming or fuel/air mixing device as the fuel enters passage 18 in the conventional manner. During operation of the internal combustion engine 14, some of the fuel in the intake charge can be expected to fall from suspension and reliquefy in intake passage 18, wherein it tends to collect along intake passage side wall 16. There, the fuel will either travel to the combustion chamber, or to low spots in the intake passage where the fuel can accumulate and evaporate. Typical causes of such loss of fuel from suspension are discussed elsewhere herein, but briefly include poor or improper atomization or vaporization by the charge forming or fuel/air mixing device, condensation due to temperature and pressure conditions, and intake flow and vacuum signal variations due to changes in throttle position and engine load. As also explained elsewhere herein, some of the intake charge will stall or change direction as it encounters reverse pulses or shock waves traveling up the side wall 16, forming reversion, represented by the small cross-hatched arrows. In some cases, reversion has been found to be so great as to flow upstream through the intake passage and charge forming device such that a cloud of fuel mist or vapor can be observed above the inlet to the charge forming or fuel/air mixing device. Poor charge formation and reversion can contribute to poor engine performance and economy, as well as to more specific problems such as dirtier exhaust emissions, spark plug fouling and the like, the latter problem being mostly attributed to raw fuel entering the combustion chamber, again, as explained elsewhere herein.

The apparatus 10 according to the present invention overcomes or significantly reduces the herein described problems and shortcomings resultant from poorly and improperly atomized or vaporized fuel, raw fuel, and reversion in the intake passages of internal combustion engines, and comprises a circuit for receiving those elements, mixing them, and redirecting or reintroducing them into the intake charge flow stream in a vaporized condition, utilizing partly the energy of the charge flow itself, and also the energy of the reversion when reversion is present. Regarding this latter source of energy, in many instances, an intake passage will contain a step such as the step 20, which step extends around all or part of side wall 16 due to the juncture of mating engine components, such as the charge forming or fuel/air mixing device and an intake manifold, or the intake manifold and engine head, thereby dividing the intake passage 18 into a downstream portion 22, and an upstream portion 24, the downstream portion 22 typically having the larger cross-sectional size, as shown. A location adjacent a step such as step 20, is a preferred location for the apparatus 10, as it positions the circuit of apparatus 10 to capture and take maximum advantage of the energy of the upstream traveling reversion, as will be explained. The circuit of apparatus 10 includes an orifice 26 at a location upstream of step 20 on or adjacent intake passage side wall 16, an opening 28 on the downstream facing step 20, and a connecting passage 30 communicating orifice 26 with opening 28. Using this circuit, it has been found that when the intake charge flows through passages 18, a suction, that is, a negative pressure or partial vacuum condition (small, thin black arrows), is generated in orifice 26 by the passage of the intake charge over the orifice. This suction is communicated by passage 30 to opening 28, and importantly, is sufficiently strong compared to the pressure conditions around opening 28, so as to draw some of the adjacent intake charge into opening 28, along with raw fuel present nearby on the side wall 16, as shown. Additionally, due to the location of opening 28 on step 20, reversion traveling upstream along side wall 16 can flow directly into opening 28. The suction, in combination with the upstream traveling reversion, has been found to be sufficient to propel the elements of reversion, intake charge and raw fuel through the passage 30 and out orifice 26 with such intensity that they enter the intake charge flow stream in a vaporized state that is both cool and dense. Upon entering the intake charge stream, some of this vapor can cycle through the circuit of apparatus 10 again, or pass through passage 18 into the combustion chamber, wherein the vaporized charge is combusted to provide the above described improved results, including more power, better engine response and economy, lower exhaust emissions, and less spark plug fouling and other problems. Additionally, because the reversion flows through the circuit of apparatus 10 and is redirected into the downstream flowing intake charge stream, any adverse effect that the reversion would otherwise have on induction is eliminated. Note that neither the circuit of apparatus 10 or step 20 significantly if at all restricts or reduces downstream flow through passage 18. Likewise, the circuit of apparatus 10 achieves improved vaporization of the fuel charge as well as vaporization of raw fuel found in the intake passage without heating and using relatively simple means, which are all important advantages of the present invention compared to prior art constructions.

Figure 2:
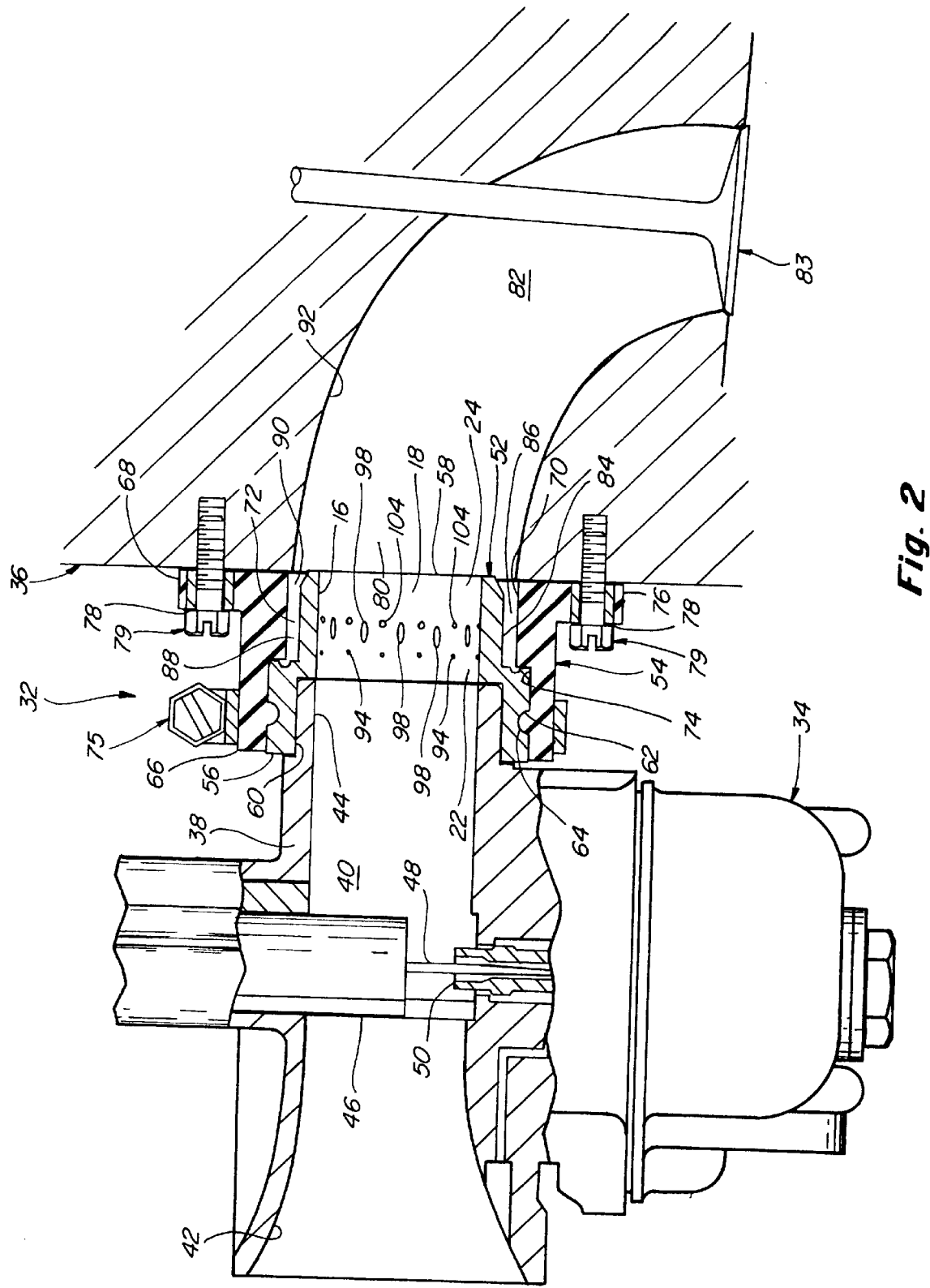
FIG. 2 is a fragmentary partial cross-sectional view of another embodiment according to the present invention including an annular body member in association with a carburetor mounting boot shown installed in the intake tract of an engine between a typical prior art carburetor and the intake port of the engine head.
Figure 4:
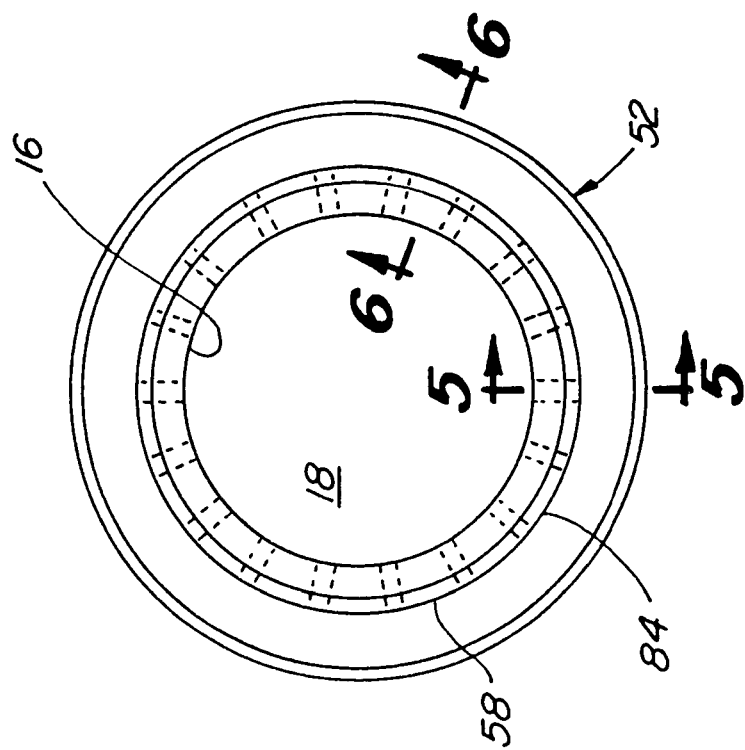
FIG. 4 is an end view of the annular body member of FIG. 2.
Figure 3:
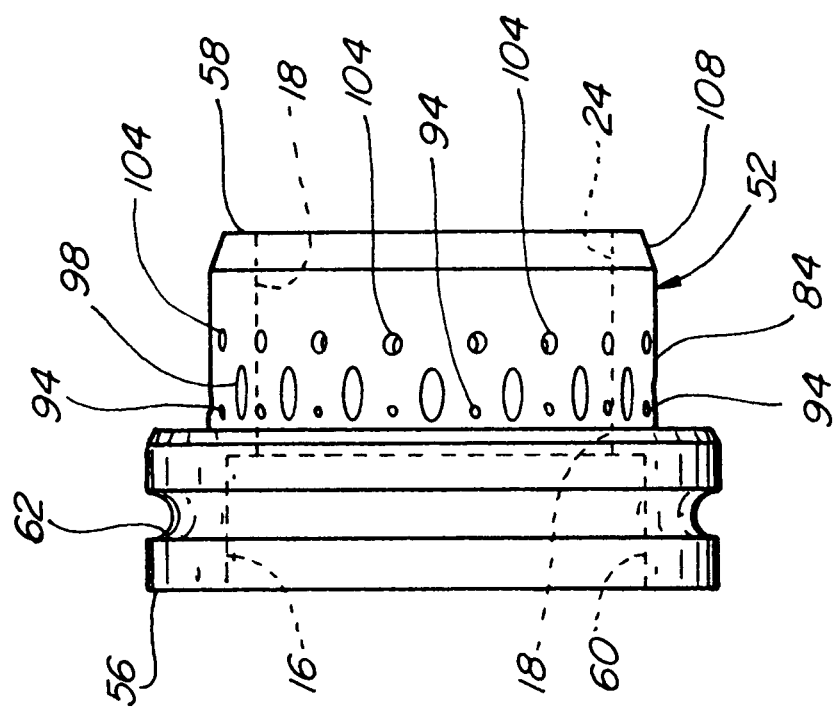
FIG. 3 is a side elevational view of the annular body member of FIG. 2.

FIGS. 2–8 show another embodiment of the present invention 32. The embodiment 32 is shown in FIG. 2 mounted in association with a MIKUNI brand model TM carburetor 34 on a cylinder head 36 of an internal combustion engine for a watercraft or similar vehicle (not shown), but likewise can be used in association with a wide variety of other carburetors and engines. The carburetor 34 is of conventional construction and operation and includes a carburetor body 38 defining a carburetor bore 40 extending therethrough between an intake opening 42 and an outlet opening 44. The carburetor 34 includes a throttle member 46 mounted in carburetor body 38 for slidable movement across carburetor bore 40 to control flow therethrough. Throttle member 46 includes an elongated needle member 48 adjustably mounted on the end thereof, which needle member 48 has a tapered distal end that moves longitudinally in the bore of a needle jet 50 as the throttle member 46 moves across carburetor bore 40 for regulating the introduction of fuel into the air stream flowing through carburetor bore 40. Referring also to FIGS. 3–6, embodiment 32 is of two piece construction including an annular inner body member 52 and an annular outer boot member 54. The inner body member 52 can be formed of any suitable material such as metal or plastics. Member 52 includes an upstream end 56, a downstream end 58, and an annular inner side wall 16. Sidewall 16 defines an intake passage 18 extending through the member 52 between ends 56 and 58, and includes an upstream end 22 and a downstream end 24 as in the previously disclosed embodiment. Upstream end 56 of inner body member 52 forms a counterbore 60 around upstream end 22 of passage 18, which counterbore 60 is adapted for cooperatively receiving in intimate engagement the outlet end of carburetor body 38 which is modified for this purpose. Carburetor body 38 can be secured to body member 52 utilizing any suitable means such as a press fit, adhesives, and the like. The outer portion of end 56 of body member 52 has the same outer shape and size as the end of carburetor body 38 before modification, including an annular groove 62 formed therein, which groove 62 is adapted for cooperatively receiving an annular lip 64 extending around the inner surface of outer boot 54, such that body member 52 replaces carburetor body 38 in boot 54. This enables the invention to be installed in boot 54 without altering the overall dimensions of the carburetor and boot assembly.

Outer boot member 54 is a conventional carburetor mounting boot made of a flexible, rubbery material. Boot 54 has an upstream inlet end 66, a downstream outlet end 68, and an annular inner side wall 70 extending between ends 66 and 68 defining a passage 72 through the boot. Inlet end 66 has a counterbored portion 74 around the inner surface of which lip 64 is formed for receiving and holding a conventional carburetor body, but which in this instance receives upstream end 56 of inner body member 52 which is interchangeable with the carburetor as just explained. The outer portion of upstream end 66 of boot 54 is adapted for the placement therearound of suitable means for sealably retaining the upstream end 56 of body member 52 therein, such as a conventional hose or band clamp 75 as shown. Downstream end 68 of boot 54 includes an outer flange portion 76 therearound having holes 78 extending therethrough for receiving mounting bolts 79, as shown, for fixedly mounting boot 54 to cylinder head 36 in the conventional manner. When bolted to head 36, boot 54 is positioned over inlet port 80 of intake passage 82 extending through head 36 to a combustion chamber (not shown). Communication between the intake passage and combustion chamber is controlled by axial movement of intake valve 83 in the conventional manner. A gasket is normally located between downstream end 68 of boot 54 and cylinder head 36 for sealing the juncture therebetween, but is deleted here for simplicity.

Figure 8:
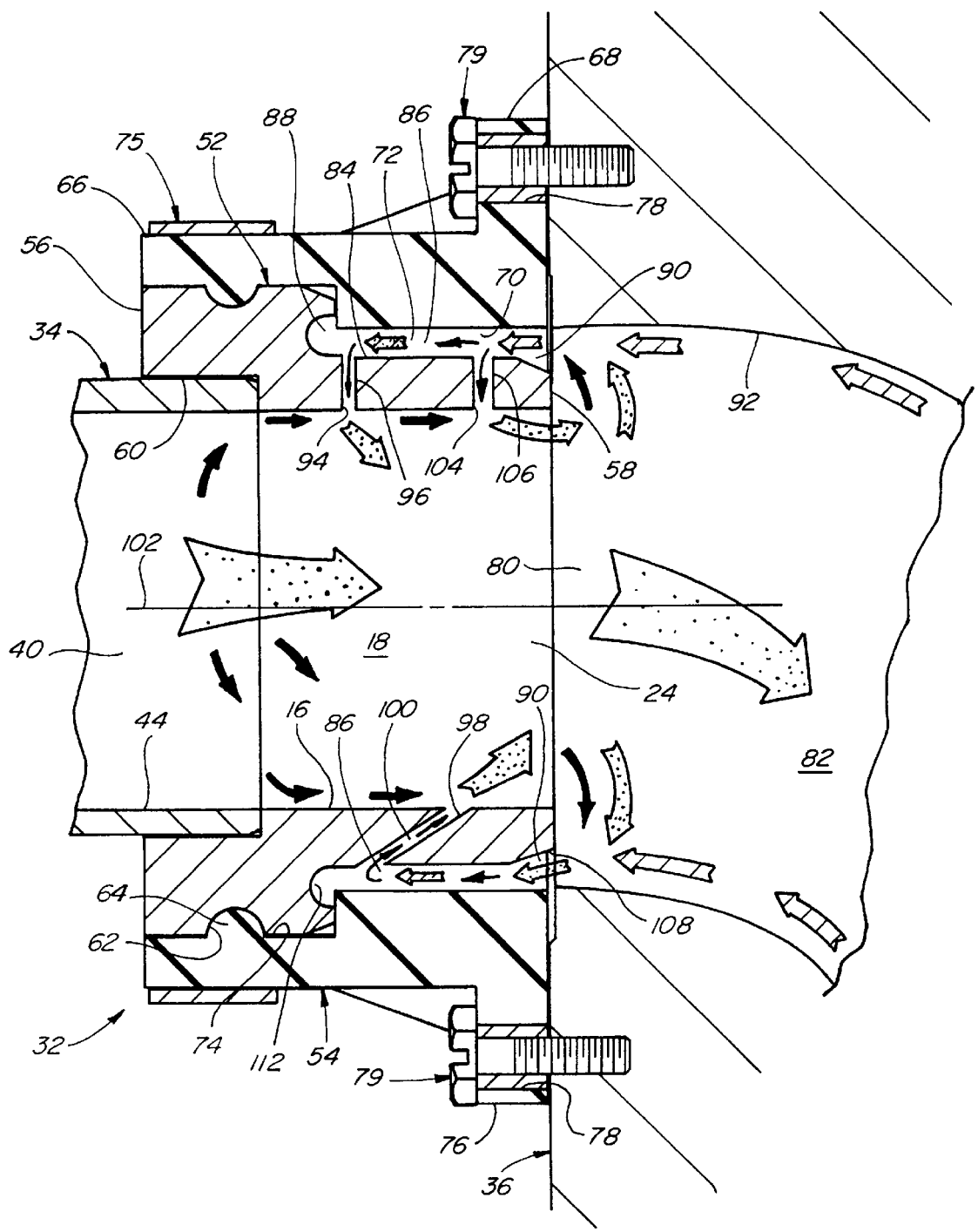
FIG. 8 is an enlarged fragmentary partial cross-sectional view of the embodiment of FIG. 2, showing in diagrammatic form the operation of the invention.

Downstream end 58 of inner body member 52 has an outer annular surface 84 which is smaller in diameter than annular inner side wall 70 of boot 54, such that when body member 52 is installed in boot 54, an annular connecting passage 86 is formed between outer surface 84 and inner side wall 70. Annular connecting passage 86 has a closed upstream end 88 and an open downstream end 90, inner side wall 70 of boot 54 having roughly the same diameter as annular side wall 92 of inlet port 80 such that side walls 70 and 92 form a generally continuous surface, which is advantageous as will be explained. A plurality of orifices 94 are located on inner side wall 16 of body member 52 at radially spaced intervals around passage 18, the orifices 94 communicating with annular connecting passage 86 through a plurality of lateral connecting passages 96, respectively, which passages 96 are shown in FIG. 5 and 8. Similarly, a plurality of orifices 98 are located on side wall 16 at radially spaced intervals around passage 18, radially and slightly axially offset from orifices 94. Orifices 98 communicate with annular passage 86 through a plurality of lateral connecting passages 100, respectively, which passages 100 are shown in FIGS. 6 and 8. Lateral connecting passages 100 are each oriented at about a 30° angle to axis 102 of member 52 (FIG. 8). A plurality of orifices 104 are located on side wall 16 at radially spaced locations corresponding to the locations of orifices 94, but at a more downstream location, and communicate with annular connecting passage 86 through a plurality of lateral connecting passages 106, respectively, as shown in FIGS. 5 and 8. During operation, as will be discussed next, orifices 94, 98 and 104 each generate a suction or negative pressure condition therein which is communicated to annular connecting passage 86 via lateral connecting passages 96, 100 and 106, respectively, when an intake charge flows through intake passage 18. The approximately 30° angular orientation of passages 100 noted above directs the discharge through orifices 98 generally over orifices 104, which serves to enhance or boost negative pressure generation in orifices 104. In this regard, although lateral passages 100 are oriented at about a 30° angle as shown, other degrees of angular orientation or no angular orientation can be used, depending on the effect sought. For instance, for some other applications, angles of about 7° have been found to provide the best degree of negative pressure enhancement in orifices 104. The suction or negative pressure condition generated in all of the orifices collectively acts to draw elements of the intake charge flow into open downstream end 90 of passage 86, along with elements of raw fuel that may be present adjacent open end 90, most likely on side wall 16 and 92. Additionally, reversion traveling in the upstream direction along side wall 92 through inlet opening 80 will naturally enter open end 90, which will also tend to draw some of the intake charge as well as nearby raw fuel into open end 90. To facilitate entry of intake charge and raw fuel into open end 90, downstream end 58 of body member 52 can optionally include a beveled or tapered edge 108, and/or a plurality of serrations 110, as shown in FIG. 7. Further, closed upstream end 88 of annular connecting passage 86 preferably has a curved shape such as shown at 112 (FIGS. 5, 6 and 8), to facilitate redirection of flow through passage 86 into the lateral connecting passages, particularly passages 100.

Referring to FIG. 8, the operation of the embodiment 32 is shown in its saturated condition at or approaching wide open throttle. In the saturated condition, as the intake charge (large dotted arrows) flows through passage 18 through body member 52, a suction or negative pressure condition (small, thin black arrows) is created in orifices 94, 98 and 104 by the flow over the orifices. The negative pressure condition is communicated to annular connecting passage 86 through lateral connecting passages 96, 100, and 106. The negative pressure condition is then communicated through annular connecting passage 86 to its open downstream end 90, where elements of the intake charge (smaller dotted arrows) as well as raw fuel (small, thick black arrows) are drawn into open downstream end 90 by the negative pressure. At the same time, reversion (small cross-hatched arrows) traveling up side wall 92 enters open downstream end 90 of passage 86. There, the energy of the negative pressure induced flow condition, combined with that of the reversion, mixes and drives or propels the elements of intake charge, raw fuel, and reversion through annular connecting passage 86, through lateral connecting passages 96, 100, and 106, and out through orifices 94, 98, and 104 into passage 18 in a cool, dense, vaporized state ( small, dotted arrows exiting orifices 94, 98, and 104). Some of the newly vaporized charge passes into intake passage 82 through inlet opening 80 and goes onto the combustion chamber, while some is cycled through the circuit one or more times, as shown, then passes into intake passage 82.

At lower throttle conditions (not shown), orifices 94 generate the earliest and greatest negative pressure. This is believed to be due in part to the more upstream location of orifices 94, and also the relatively small size of orifices 94 compared to the others. Also, because orifices 94 are located closest to the closed upstream end 88 of annular passage 86, reversion traveling up through passage 86 is believed to be more likely to be directed through orifices 94 as it encounters the end of the passage. As throttle is increased or orifices 94 otherwise become saturated with exiting vapor, some of the flow through the circuit towards orifices 94 will be diverted to and pass through orifices 98. Then, as throttle is increased more, both orifices 94 and 98 will become saturated with exiting vapor, and some of the flow will be diverted to orifices 104, until the entire circuit is saturated. Regarding orifices 104, it has been found that these orifices generate the lowest negative pressure, due in part to their more downstream location and in part to their relative large size. However, this is compensated for somewhat by the angularly directed output of orifices 98 over orifices 104 which acts to boost the negative pressure generated by flow over orifices 104 at least to some degree. As throttle is lessened, the flow through orifices 104 lessens first, followed by orifices 98 and 94.

FIG. 9*a* is a graph which compares the actual measured horsepower output versus crankshaft revolutions per minute (rpms) of an internal combustion engine using MIKUNI brand carburetors with the above described embodiment 32, and those same parameters for the same engine using the same carburetors under the same conditions, but without the present invention. The tested engine was a 1995 ROTAX brand 781 cc RAVE engine having a 7.15:1 compression ratio and a 50:1 fuel/oil ratio. In this regard, it should be noted that a ROTAX brand engine differs somewhat from the engine shown in FIGS. 2 and 8, in that a rotary type intake valve is used in place of conventional valve 83. The ambient temperature during the test was 82° F.; the relative humidity was 54 percent; and the barometric pressure was 29.95 in. Hg. The engine was tested on a personal watercraft having a pump pressure of 37 psi and a discharge temperature of 110° F. The vertical axis or ordinate of FIG. 9*a* represents horsepower, and the horizontal axis or abscissa represents crankshaft rpms. The horsepower output of the engine with the present invention is shown by the curve identified by the letter A. The horsepower output for the engine without the present invention is represented by the curve identified by the letter B. Comparing horsepower output curves A and B, it can be seen that an engine including the present invention delivers greater horsepower sooner and has a higher maximum horsepower than the engine without the present invention. In fact, at maximum horsepower output, the engine with the present invention produced over 120 horsepower, whereas the engine without the present invention produced just under 110 horsepower, a substantial difference.

Figure 9B:
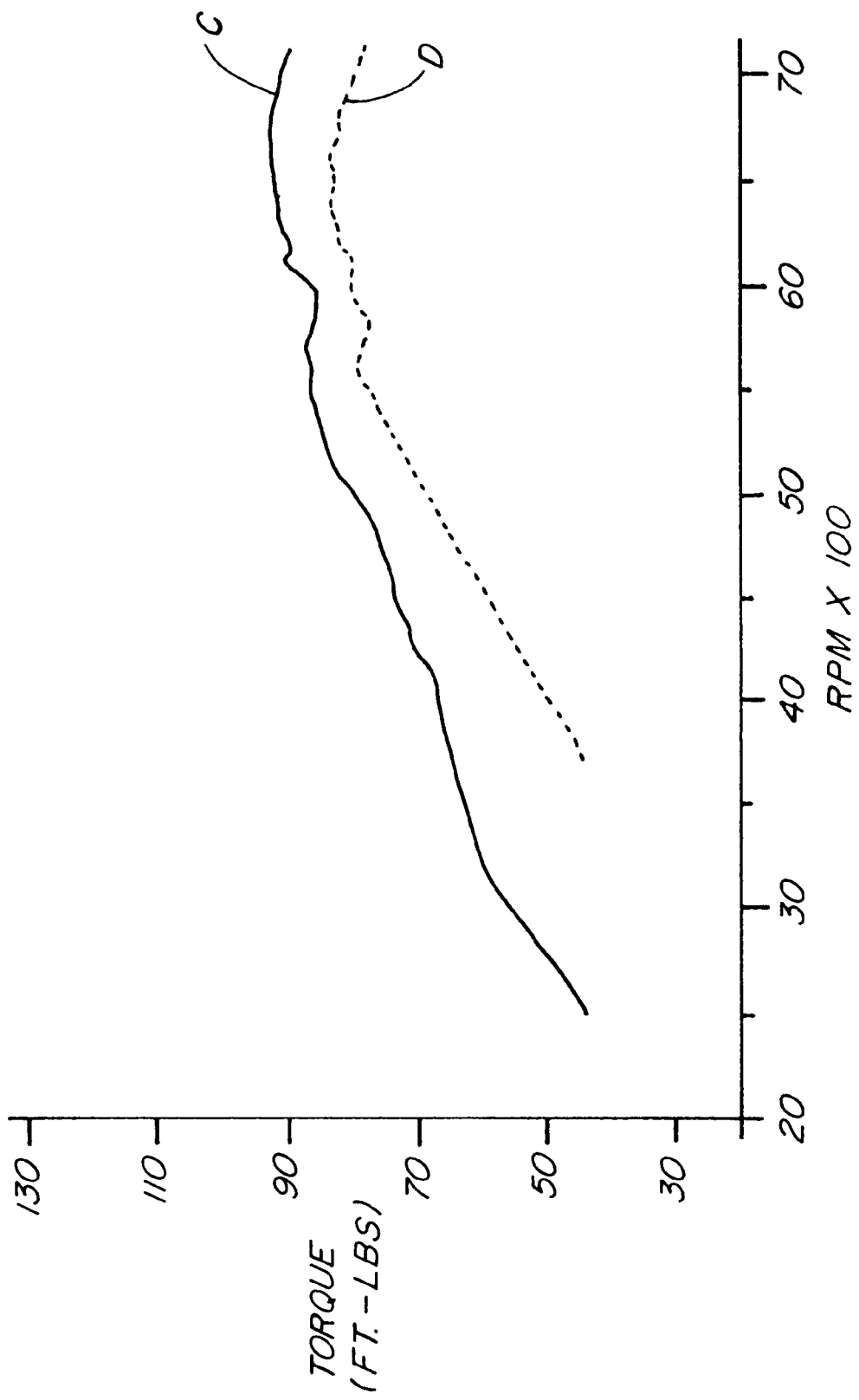
FIG. 9b is a graph comparing the torque output over crankshaft rpms of the engine of FIG. 9a, with and without the present invention.

FIG. 9*b* is a graph which compares the actual measured torque output versus crankshaft rpms of the engine of FIG. 9*a* with and without the present invention. The vertical axis or ordinate represents torque in foot pounds, and the horizontal axis or abscissa represents crankshaft rpms. The torque output of the engine with the present invention is shown by the curve identified by the letter C. The torque output for the engine without the present invention is represented by the curve identified by the letter D. Comparing torque output curves C and D, it can be seen that an engine including the present invention delivers greater torque sooner and has a higher maximum torque than the engine without the present invention, the maximum torque output being approximately 10 foot pounds greater.

Another important improvement observed in this test was a notable increase in BMEP (Brake Mean Effective Pressure) when the present invention was used. BMEP is a measure of the volumetric efficiency of an engine expressed in pounds per square inch (psi) and is representative of relative induction. BMEP can be calculated using the following formulae:

$$BMEP = \frac{horsepower \times 6500}{L \times RPM} \text{ or } \frac{torque \times 6500}{L \times 5252}$$

where $L$ equals engine displacement in liters

Maximum volumetric efficiency of the tested engine using the present invention was calculated to be about 147 psi. Without the present invention, volumetric efficiency was no greater than about 133 psi. This represents a gain of at least 14 psi, which is a substantial difference and demonstrates the increased induction capabilities provided by the present invention. Other results observed when using embodiment 32 in the above test include a temperature drop in the intake passage estimated at approximately 200° F., and an exhaust temperature decrease ranging from between about 200° to about 500° F. compared to without the present invention. Operational improvements include higher, more consistent intake vacuum, smoother engine operation, and cleaner exhaust emissions. As noted above, the vapor produced using the present invention is dense. This density, along with the greatly reduced temperature of the vapor, are believed to be the principal reasons for the greater horsepower, torque, and BMEP. This is because the denser intake charge contains more combustible fuel. Also, the cooler vapor absorbs more energy in the form of heat as it travels through the intake passage, then releases it when combusted. Further, because of the above factors, combustion is more complete and occurs more rapidly in the combustion chamber, such that fewer combustible components exist in the exhaust, thereby reducing secondary combustion in the exhaust and lowering exhaust temperatures and emissions.

Figure 10:
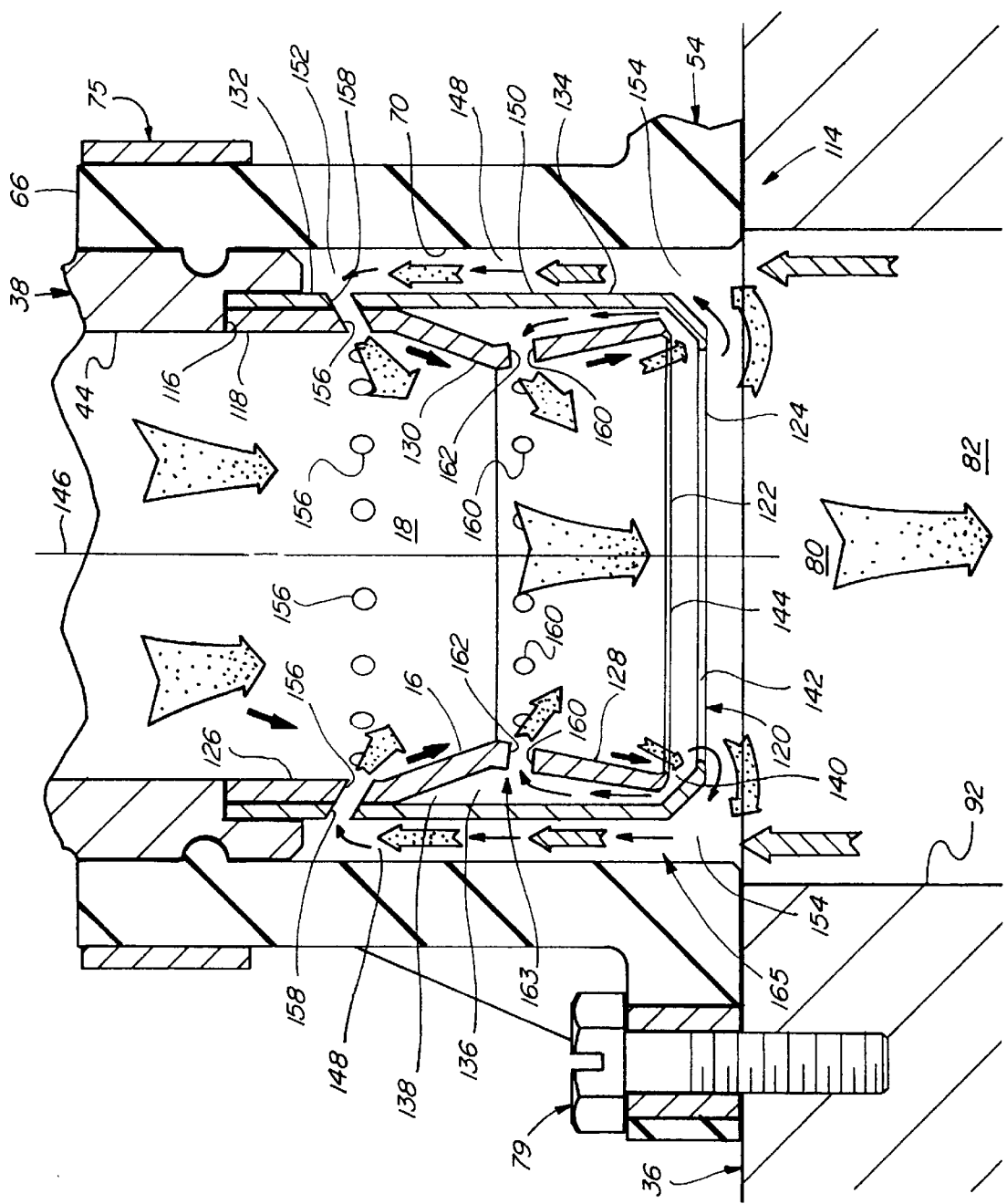
FIG. 10 is a fragmentary cross-sectional view of an embodiment of the present invention including two circuits nested together in a carburetor mounting boot installed between a typical prior art carburetor and the intake port of an internal combustion engine, showing in diagrammatic form the operation of the two circuits.

Referring to FIG. 10, another embodiment 114 according to the present invention is shown. The embodiment 114, like the embodiment 32, mounts to a carburetor body 38 and utilizes a conventional carburetor mounting boot 54 as part of the invention. The embodiment 114 can be mounted to carburetor body 38 using any suitable means such as disclosed with regard to embodiment 32 above, or the means shown which include a small counterbore 116 machined or otherwise formed around the inner periphery of outlet opening 44 of carburetor body 38. Counterbore 116 is sized and shaped for receiving upstream inlet end I 18 of an annular body member 120 in intimate engagement such that body member 120 is suspended in boot 54, as shown. Body member 120 can be affixed to carburetor body 38 using any suitable means such as a press-fit or adhesives as before. Using this arrangement, upstream boot end 66 receives the end of carburetor body 38 and is secured therearound in the conventional manner utilizing a conventional hose clamp 75 or the like. Boot 54 can be attached to cylinder head 36 over inlet port or opening 80 of intake passage 82 in the conventional manner, using bolts 79 as explained above.

Annular body member 120 is of two piece construction, including an inner tubular member 122 and an outer tubular member 124. Inner tubular member 122 includes an inner side wall 16 that defines an intake passage 18 therethrough extending between an upstream end 126 and a downstream end 128, as in the previous embodiment. Additionally, however, inner tubular member 122 includes an optional intermediate portion 130 which is smaller in cross-sectional size than both upstream end 126 and downstream end 128 such that inner tubular member 122 forms a restriction in passage 18. Outer tubular member 124 includes an upstream end portion 132 and a downstream end portion 134. Upstream end 126 of inner tubular member 122 is swaged or otherwise intimately secured in upstream end portion 132 of outer tubular member 124 so as to effectively suspend downstream end portion 128 and intermediate portion 130 of inner member 122 in coaxial relation in outer tubular member 124. Inner tubular member 122 is somewhat shorter, as measured from end 126 to end 128, than outer tubular member 124. Also, downstream end 128 and intermediate portion 130 of inner tubular member 122 are somewhat smaller in cross-section than outer tubular member 124 such that a first annular connecting passage 136 is formed between members 122 and 124. Annular connecting passage 136 has a closed upstream end 138 and an open downstream end 140. Downstream end 128 of inner tubular member 122 and downstream end 134 of outer tubular member 124 form annular lips 142 and 144, respectively, which annular lips 142 and 144 extend radially inwardly slightly toward longitudinal axis 146 of both tubular members, lip 142 of the outer member extending slightly radially inwardly of lip 144. A second annular passage 148 is formed between outer surface 150 of outer tubular member 124 and inner surface 70 of boot 54. Second annular passage 148 has a closed upstream end portion 152 and an open downstream end portion 154. Side wall 16 of inner tubular member 122 includes a plurality of radially spaced orifices 156 adjacent upstream end 126, each orifice 156 communicating with second annular connecting passage 148 through a lateral connecting passage 158 extending through both inner tubular member 122 and outer tubular member 124. Each of the lateral connecting passages 158 can be oriented at an acute angle with respect to axis 146 so as to extend in somewhat of a downstream direction, as explained with regard to passages 100 above. Similarly, a plurality of radially spaced orifices 160 are located on side wall 16 at a more downstream location just below restricted intermediate portion 130. Each orifice 160 communicates with annular passage 136 through a lateral connecting passage 162. Orifices 160, connecting passages 162, first annular connecting passage 136, and open end portion 140 of passage 136 form a first circuit 163 according to the present invention. Orifices 156, connecting passages 158, second annular passage 148, and open end portion 154 of passage 148 form a second circuit 165.

In operation, as an intake charge (large dotted arrows) passes through passage 18 of embodiment 114, a partial vacuum condition will be created in orifices 156 and 160 by the flow thereover. The vacuum condition in orifices 156 is generated solely by flow over those orifices, while the vacuum condition in orifices 160 is generated by flow over those orifices as well as by a reduced pressure condition as a result of the flow restriction at intermediate portion 130. The vacuum condition in orifices 160 is communicated through first circuit 163 to open end portion 140, while the vacuum condition in orifices 158 is communicated through second circuit 165 to open end portion 154. The vacuum conditions in circuits 163 and 165 draw elements of the intake charge and raw fuel into the respective circuits wherein the elements are cycled back into the intake stream in a vaporized state in essentially the same manner as described with regard to embodiments 10 and 32 above. Differently from the above described embodiments, annular lip 142 serves to direct or deflect some of the downstream flow traveling along side wall 16 into open end 140 of first circuit 163. Outer annular lip 142 can also serve in some capacity as a collection point for raw fuel for circuit 163, and inner annular lip 144 can serve as a drip edge for the fuel. Annular lip 142 is slightly larger in minimum diameter compared to reduced intermediate portion 130 such that no significant further restriction of charge flow occurs as a result of the presence of annular lip 142, in contrast to fuel collecting means in prior constructions. Also note that annular lip 142 acts somewhat as a barrier to entry of reversion into open end 140 of first circuit 163. To receive reversion, annular inner side wall 70 of boot 54 is located in general registration with side wall 92 of inlet port 80 such that reversion can readily flow into open downstream end 154 of second circuit 165. Reversion, as well as any raw fuel that makes it around annular lip 142, and some elements of intake charge will enter open end 154 of the second circuit and will be urged by the energy of the reversion as well as the vacuum condition generated therein through passages 148 and 158 of the circuit, whereupon the reversion, intake charge, and raw fuel will mix and pass through the respective orifices 156 and 160 and enter passage 18 as a vapor. Again, as discussed with regard to the previous embodiment, some of the reversion, intake charge and fuel will likely be cycled one or more times through the respective circuits. This embodiment demonstrates usage of separate apparatus constructed according to the teachings of the present invention in cooperation, the respective apparatus being configured slightly differently for performing different roles. In particular, first circuit 163 provides primarily an intake flow driven circuit, while second circuit 165 is more of a reversion driven circuit.

Figure 11:
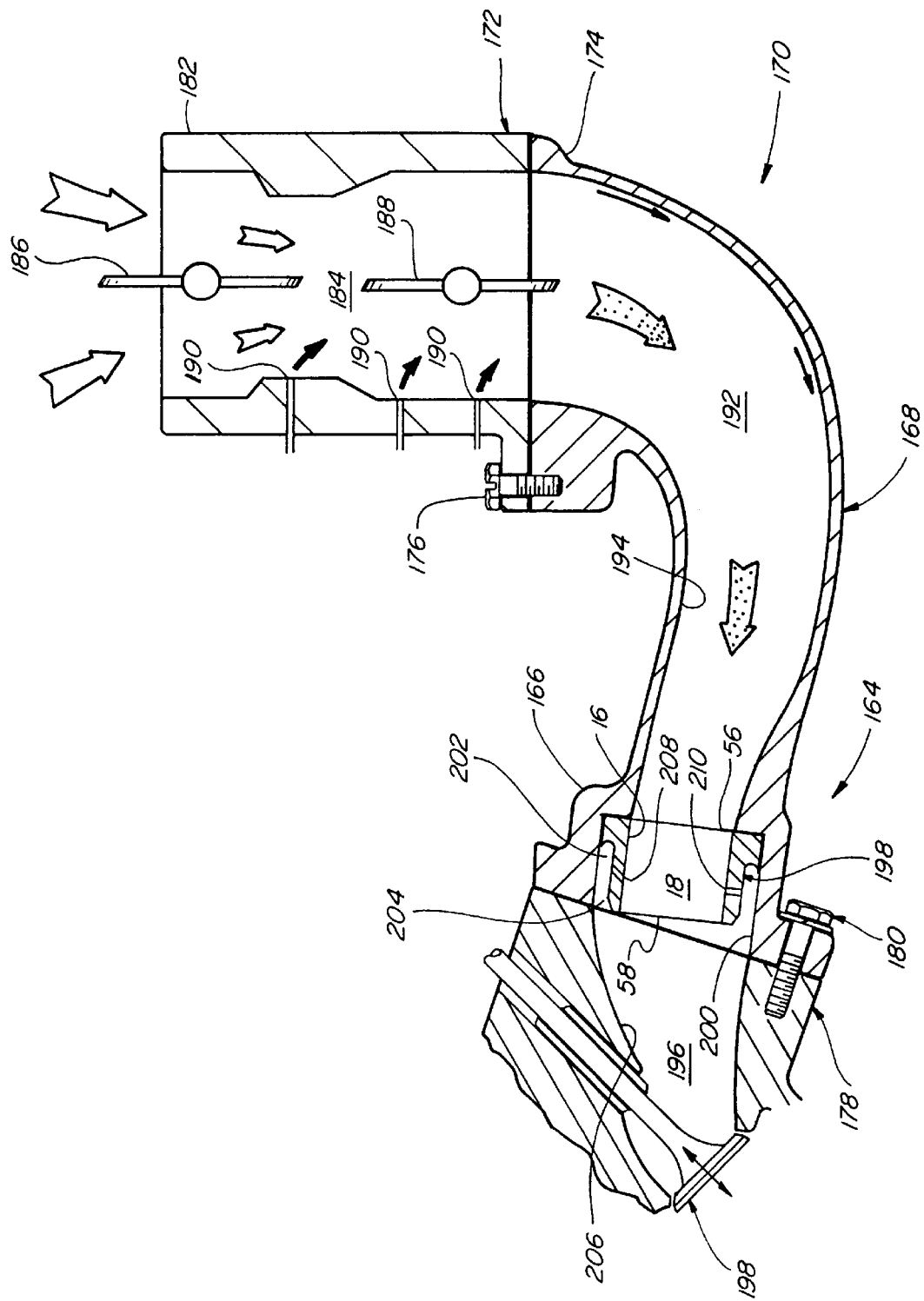
FIG. 11 is a fragmentary cross-sectional view of another embodiment of the present invention incorporated into the downstream end of an intake manifold of a conventionally carbureted internal combustion engine.

FIG. 11 shows still another embodiment 164 of the present invention installed in the downstream end portion 166 of an intake manifold 168 of an internal combustion engine 170. The internal combustion engine 170 shown is representative of a wide variety of internal combustion engines of both single and multiple cylinder construction, and is conventionally aspirated using carburetor 172 which is mounted to the upstream end 174 of intake manifold 168 with bolts 176. Downstream end 166 of intake manifold 168 is similarly bolted to engine head 178 utilizing bolts 180. Carburetor 172 is of conventional construction and includes a carburetor body 182 defining a carburetor bore 184 therethrough. A choke plate 186 and a throttle plate 188 are mounted for rotation in bore 184 for regulating flow therethrough. Carburetor body 182 further includes a plurality of orifices 190 in communication with carburetor bore 184 for delivering liquid fuel (small black arrows) from a fuel source (not shown) to an air flow stream (large white arrows) flowing through bore 184. Carburetor 172 is mounted to intake manifold 168 such that carburetor bore 184 is in registration with intake passage 192, which passage 192 is defined by a side wall portion 194. Similarly, downstream end portion 166 of intake manifold 168 is mounted to engine head 178 with the downstream end of intake passage 192 in registration with intake port 196 of engine head 178. Carburetor bore 184, intake passage 192 and port 196 provide a continuous conduit for the flow of an intake charge stream from carburetor 172 through intake manifold 168 and head 178 into a combustion chamber of the engine (not shown) which flow into the combustion chamber is regulated by the reciprocal operation of a valve member 198.

Embodiment 164 includes an annular body member 198 fixedly mounted in a counterbore 200 machined or otherwise formed in downstream end portion 166 of intake manifold 168. Annular body member 198 is similar in many respects to annular body member 52 of previous embodiment 32 in that it includes a side wall portion 16 defining an intake passage 18 therethrough extending between an upstream end portion 56 and a downstream end portion 58. Side wall 16 of member 198 is positioned in registration with the downstream portion of intake passage 192 of intake manifold 168 such that flow through passage 192 will flow through passage 18 substantially unrestricted. The outer portion of upstream end portion 56 of body member 198 is sized and shaped so as to be cooperatively receivable in counterbore 200 and can be secured in counterbore 200 as shown using any suitable means such as a press fit or adhesives. Downstream end portion 58 of body member 198 is smaller in cross-sectional size than counterbore 200, such that an annular connecting passage 202 is formed between the inner surface of counterbore 200 and the outer surface of side wall 16 of member 198. Annular passage 202 has an open downstream end 204. Open end 204 lies in registration with side wall 206 defining intake port 196 in engine head 178, such that any reverse flow traveling along side wall 206 can enter open end 204. Side wall 16 includes a plurality of orifices 208 and 210 therethrough communicating intake passage 18 with annular passage 202. Orifices 208 are oriented at a downstream facing angular orientation, which can be the same as or different from that of lateral connecting passages 100 of embodiment 32 above, whereas orifices 210 are oriented substantially transversely with respect to passage 18.

Embodiment 164 operates in substantially the same manner as embodiment 32 above. Briefly, as the air stream passes through carburetor bore 184, fuel will be introduced through orifices 190 into the air stream to form an intake charge flow. The intake charge flow will pass from carburetor bore 184 through intake passage 192 of manifold 168 and through intake passage 18 of body member 198. As the intake charge flows in passage 18 over orifices 208 and 210, a suction or negative pressure condition will be created in the orifices, which suction will be communicated through the orifices to annular passage 202. This suction will be communicated through the cavity to the open downstream end portion 204 and into the intake passage 18 so as to draw some of the passing intake charge flow into open end 204, through cavity 202 and orifices 208 and 210, whereupon such flow will be reintroduced into the intake charge flow stream in intake passage 18. Simultaneously, liquid fuel collected on side wall 206 of engine head 178, as well as reversion traveling in the upstream direction along wall 206, will enter open end 204, pass through cavity 202 and orifices 208 and 210 mixed with the exiting intake charge, and enter the intake charge stream. Such elements of intake charge, raw fuel, and reversion entering intake passage 18 through orifices 208 and 210 will be cool, densely vaporized and will pass with the intake charge flow stream through intake port 196 and into the combustion chamber. Results that can be expected are similar to those discussed above, including increased horsepower and torque, as well as lowered exhaust temperature and emissions. Also, induction and engine responsiveness will be considerably improved.

Figure 12:
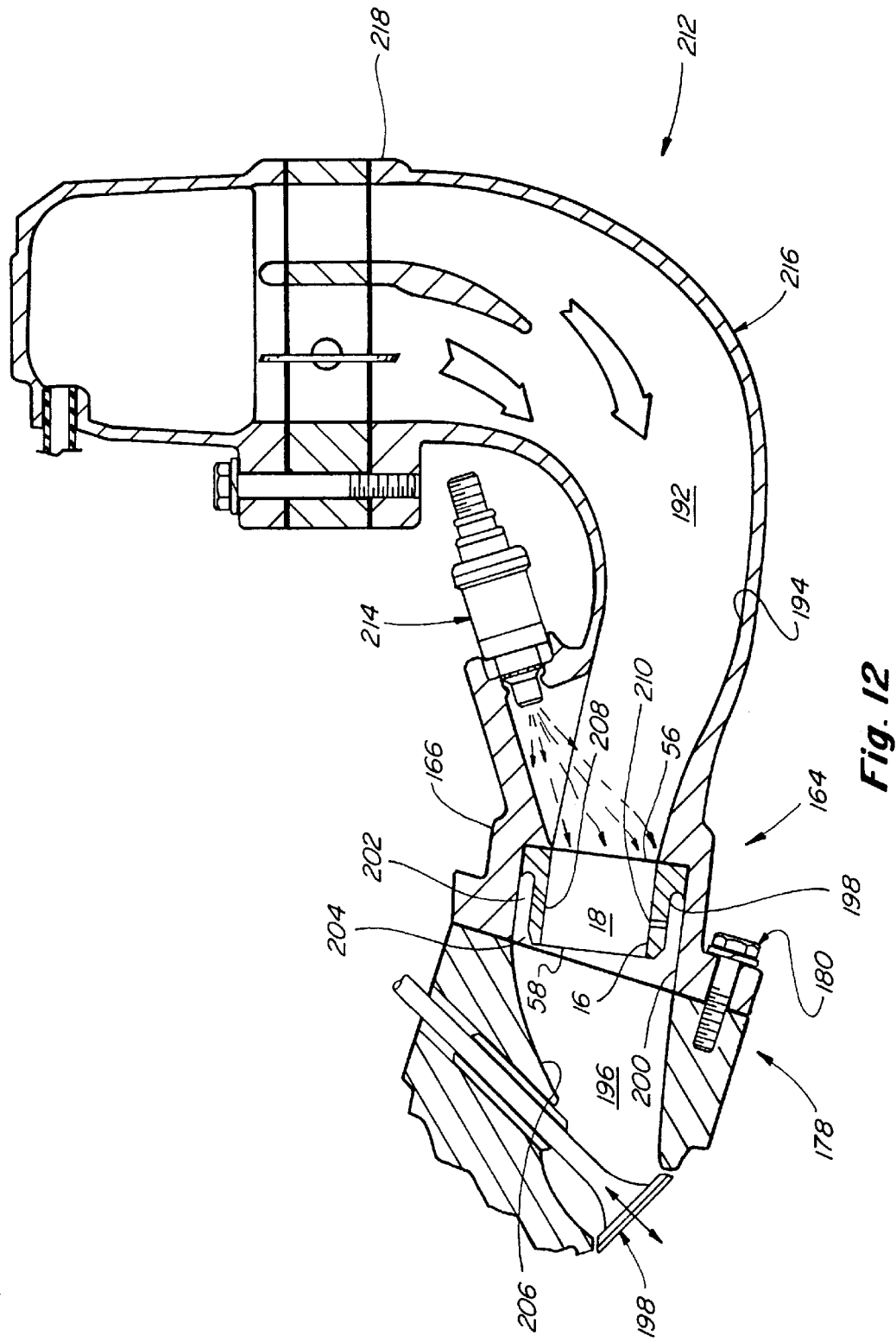
FIG. 12 is a fragmentary cross-sectional view of the embodiment of the present invention of FIG. 11, incorporated into the downstream end of an intake manifold of a fuel injected internal combustion engine.

FIG. 12 shows embodiment 164 of the present invention installed in the intake manifold of a fuel injected internal combustion engine 212. Engine 212 differs from engine 170 in only a few minor respects, namely, a fuel injector 214 is mounted in a port in the intake manifold 216 intermediate an upstream end portion 218 and downstream end portion 166 instead of a carburetor. Fuel injector 214 is positioned so as to inject fuel (small black arrows) in atomized pulses into an air flow stream (large white arrows) flowing through intake passage 192. The resultant fuel/air mix or intake charge passes through intake passage 18 of annular body member 198 and will be improved in the manner just described by the present invention. That is, the flow through intake passage 18 will create a suction or negative pressure condition in orifices 208 and 210, which suction will be communicated through annular connecting passage 202 to open end portion 204. The suction or negative pressure condition at open end 204 will serve to draw some of the intake charge flow into open end 204, through cavity 202 and orifices 208 and 210, whereupon such flow will reenter the intake charge flow stream. Simultaneously, some of the reversion traveling upstream along wall 206 of intake passage 196 will enter open end 204, pass through cavity 202 and orifices 208 and 210 and enter the intake charge flow stream, all of the above described elements entering the intake charge flow stream in a cool, densely vaporized mix.

Figure 13:
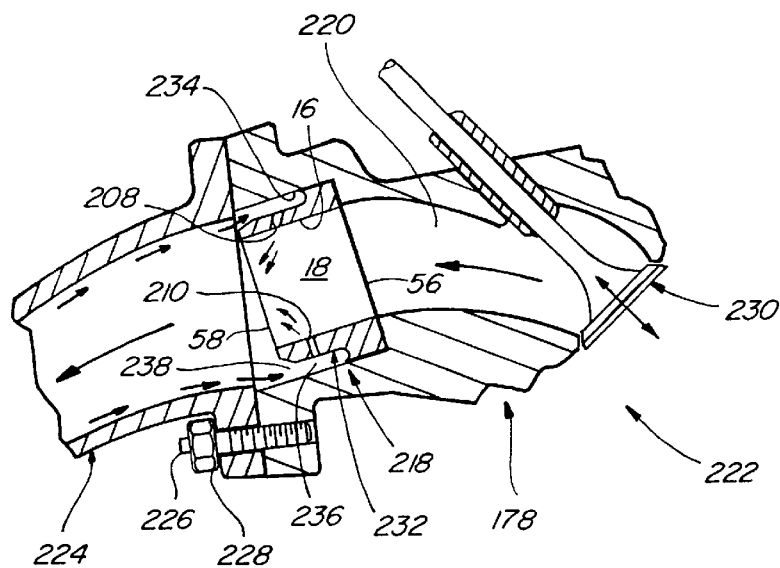
FIG. 13 is a fragmentary cross-sectional view of an embodiment of the present invention incorporated into the exhaust port of an internal combustion engine.

Referring to FIG. 13, still another embodiment 218 of the present invention is shown installed in an exhaust port 220 of an internal combustion engine 222. Engine 222, like the engines discussed above, is representative of a wide variety of both single cylinder and multiple cylinder internal combustion engines. Engine 222 includes, among other components, an engine head 178 having an exhaust manifold 224 attached thereto utilizing threaded studs 226 and nuts 228 in the conventional manner. Engine head 178 and exhaust manifold 224 form upstream and downstream portions of exhaust passage 220, respectively. Exhaust passage 220 provides a conduit for exhausting a stream of products of combustion from a combustion chamber (not shown), the flow of which exhaust stream is regulated by the reciprocal movement of an exhaust valve 230 in the conventional manner, although other types of valving could likewise be used as is the case with the previous embodiment. Embodiment 218 includes an annular body member 232 fixedly mounted in a counterbore 234 formed in engine head 178 adjacent the juncture with exhaust manifold 224. Annular body member 232 is similar in many respects to annular body member 198 of previous embodiment 164 and annular body member 52 of embodiment 32, in that it includes a side wall portion 16 defining a passage 18 extending therethrough between an upstream end portion 56 and a downstream end portion 58. Annular body member 232 differs from the previous annular body member members 198 and 52 in that passage 18 through body member 232 is an exhaust passage, as opposed to an intake passage. Due to its location in the exhaust region of the engine, body member 232 is preferably constructed of a high temperature compatible material such as stainless steel. Body member 232 is positioned in counterbore 234 with exhaust passage 18 in registration with the upstream portion of exhaust passage 220 through engine head 178, such that exhaust flow (large black arrows) through passage 220 will pass through passage 18 substantially unrestricted. The outer portion of upstream end portion 56 of body member 232 is sized and shaped so as to be cooperatively receivable and engageable with the surface of counterbore 234 and can be secured therein using any suitable means such as a press fit, high temperature adhesives and the like. Downstream end portion 58 of body member 232 is smaller in cross-section than counterbore 234, such that an annular passage 236 is formed between the inner surface of counterbore 234 and outer surface of side wall 16. Annular Passage 236 serves as a connecting passage and has an open downstream end 238, such that any back pressure traveling upstream in passage 220 along the inner surface of exhaust manifold 224 can readily enter open downstream end 238. Side wall 16 includes a plurality of orifices 208 and 210 therethrough communicating passage 18 with annular passage 236. As explained above, orifices 208 are oriented at a downstream facing angular orientation, which can be similar to that of lateral connecting passages 100 of embodiment 32 above or different, whereas orifices 210 are oriented substantially transversely with respect to passage 18.

During operation of the internal combustion engine 222, the stream of combustion products constituting the exhaust will flow through exhaust passage 220 and passage 18 through annular body member 232 in the direction shown by the large black arrows. Simultaneously, some back pressure will travel in the opposite or upstream direction through exhaust manifold 224, as shown by the small black arrows. Some of the upstream flowing back pressure will enter open downstream end 238 of annular passage 236, flow through the cavity, and exit the cavity through orifices 208 and 210 and reenter the exhaust flow stream traveling in the downstream direction. Such flow of back pressure through orifices 208 and 210 will be facilitated somewhat by suction created in passage 236 and open end 238 as a result of the exhaust flow over orifices 208 and 210. This accomplishes two purposes. First, some of the upstream traveling back pressure is redirected into the downstream direction, such that less back pressure will pass through the combustion chamber, enter the intake passage, and contaminate the intake charge. Second, the back pressure may contain some amount of uncombusted products, possibly including some unburned fuel. The unburned elements will likely combust when redirected into the main exhaust flow stream, due to combustion still occurring in the stream, or exposure to the heat thereof. Results include purer, more uniform intake charge due to the reduction in back pressure reaching the intake passage, thus improving induction. Exhaust will also be cleaner, due to the more complete combustion.

Figure 14:
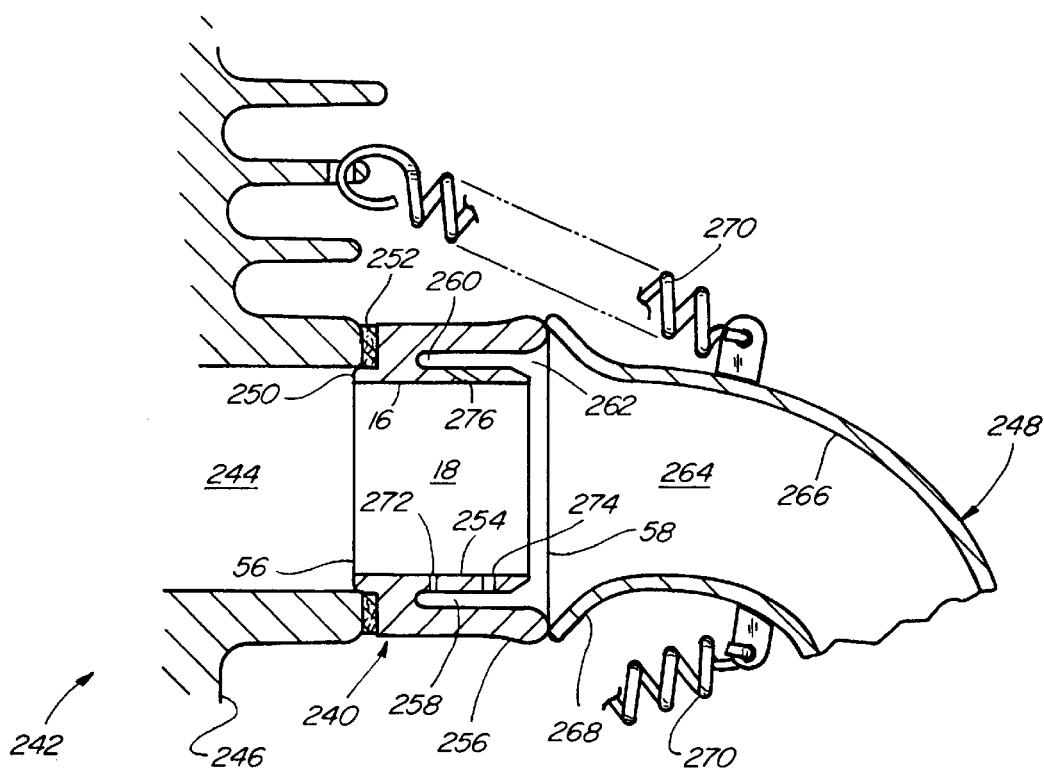
FIG. 14 is a fragmentary cross-sectional view of an embodiment of the present invention incorporated into the exhaust tract of an internal combustion engine between the exhaust port and exhaust pipe.

FIG. 14 shows another embodiment of the present invention 240 installed in the exhaust tract of an internal combustion engine 242, between an exhaust port 244 in engine head 246 and exhaust pipe 248. Embodiment 240 is a unitary annular shaped member constructed from a temperature resistant material such as stainless steel and includes an inner side wall 16 defining an exhaust passage 18 therethrough between an upstream end 56 and a downstream end 58. Upstream end 56 of embodiment 240 has a stepped shape including an endmost tubular portion 250 sized and shaped so as to be cooperatively receivable in exhaust port 244 of engine head 246. An annular gasket member 252 extends around the outside of tubular portion 250 to form a sealed condition therearound. Downstream end 58 of embodiment 240 forms concentric annular inner and outer tubular portions 254 and 256 defining an annular connecting passage 258 therebetween. Annular connecting passages 258 has a closed upstream end 260 and an open downstream end 262 located in communication with an exhaust passage 264 formed by side wall 266 of exhaust pipe 248. The end of outer tubular portion 256 has a rounded shape adapted for cooperative, sealed engagement with flared end 268 of exhaust pipe 248. Flared end 268 of exhaust pipe 248 is maintained in engagement with outer tubular portion 256 using coil springs 270 attached between exhaust pipe 248 and engine head 246 in the conventional manner. This manner of attachment enables some slight movement of exhaust pipe 248 with respect to outer tubular portion 256, while still maintaining a sealed condition therebetween and is a well known manner of attachment of exhaust pipes to the engines of offroad motorcycles and other recreational sport vehicles. Inner tubular portion 254 includes a plurality of orifices 272, 274, and 276 therethrough at radial spaced locations therearound providing communication between exhaust passage 18 and annular connecting passage 258.

Similarly to embodiment 218 above, as exhaust from engine 242 flows from exhaust port 244 through exhaust passage 18 of embodiment 240 and through exhaust passage 264 of exhaust pipe 248, suction will be created in orifices 272, 274, and 276 due to the flow thereover. Also, back pressure will develop in exhaust pipe 248 and will travel in the opposite direction towards exhaust port 244. The suction generated in orifices 272, 274, and 276 will be communicated through annular connection passage 258 to open end 262, so as to draw some of the exhaust flow stream thereinto. Simultaneously, some of the back pressure traveling in the upstream direction in exhaust passage 264 will enter open end 262, the combination of the suction and back pressure acting to mix and vaporize the collected exhaust and discharge it through the orifices. As explained above, the discharged vapor will likely contain at least some uncombusted fuel. Due to the proximity of embodiment 240 to exhaust port 244 and the existence of an exhaust flame therein, the discharge vapor will be combusted, thereby improving exhaust induction and emissions, and reducing back pressure that can travel from the exhaust through the combustion chamber to the intake tract.

Figure 15:
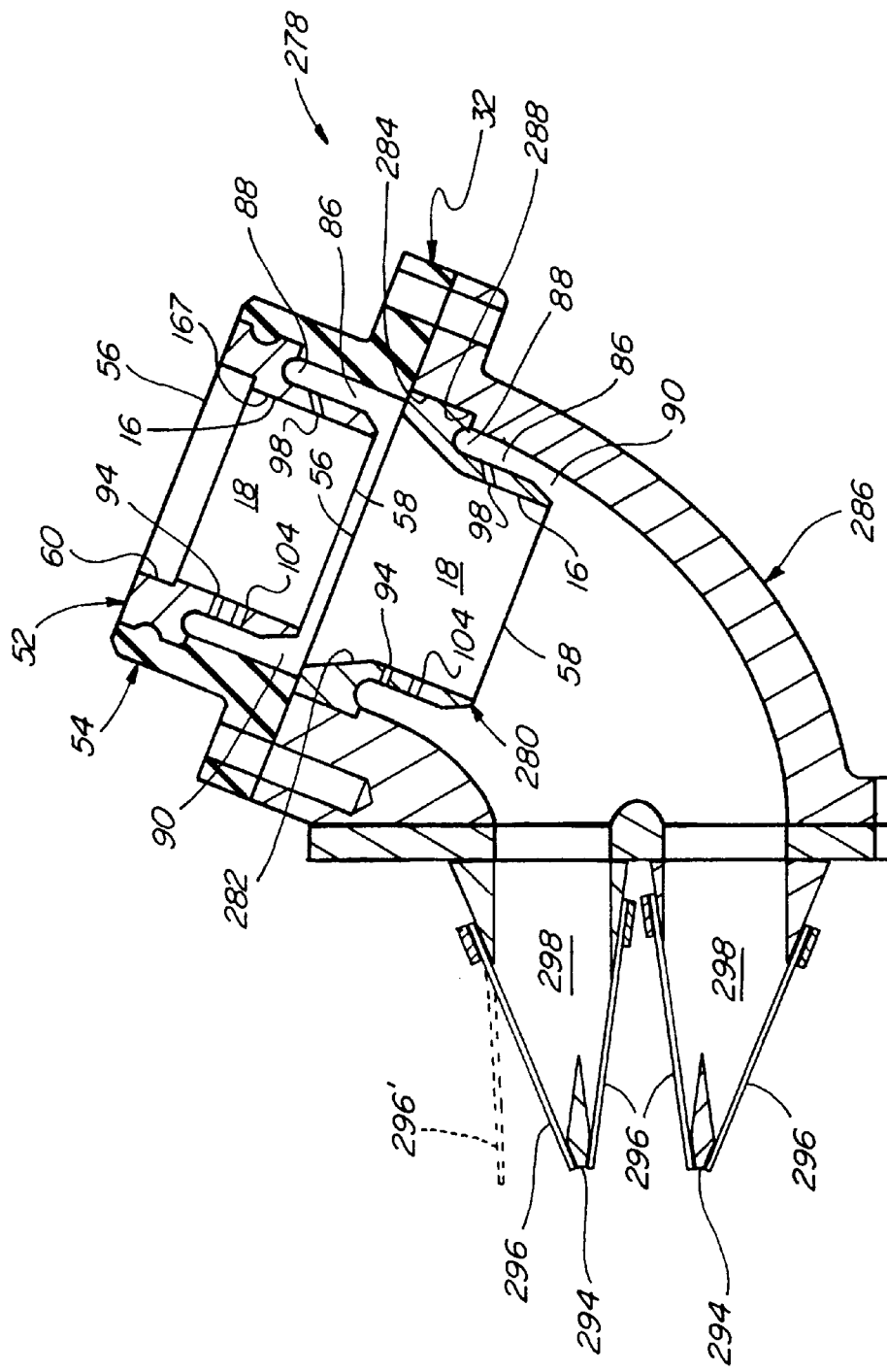
FIG. 15 is a fragmentary cross-sectional view of still another embodiment of the present invention demonstrating use of two circuits in an upstream downstream arrangement including a first circuit incorporated into a carburetor mounting boot and another in the upstream end of an intake manifold of an engine and showing a typical prior art reed cage at a downstream location for controlling communication between the intake manifold and intake port of the engine.

FIG. 15 shows an embodiment of the present invention 278 which demonstrates the compounding capabilities that can be achieved by utilizing apparatus according to the present invention in an upstream downstream arrangement. Embodiment 278 is an assembly including embodiment 32 discussed above, and an additional annular body member 280 which differs from annular body member 52 of embodiment 32 only by the provision of a frusto-conical side wall surface 282 adjacent upstream end 56 thereof and minor changes. Embodiment 32 is positionable as shown in registration with the inlet opening 284 of an intake manifold 286 and is securable thereto using bolts (not shown), while annular body member 280 is cooperatively receivable in a counterbore 288 machined or otherwise formed in inlet opening 284 and held in place in counterbore 288 by attachment of embodiment 32 to manifold 286 thereover. Intake manifold 286 includes a mounting end 290 adapted for mounting either directly over the intake port of an internal combustion engine (not shown) or over a reed cage mounting plate, such as the mounting plate 292 shown which includes a pair of reed cage assemblies 294 positionable inside an engine intake port in the conventional manner. Briefly, reed cage assemblies 294 each include a plurality of yieldable reed members 296 which in their free state are positioned as shown in solid lines to close the downstream end of intake passage 298 through plate 292 and prevent passage through passages 298, but which are yieldable such as shown in phantom at 296' under the force of induction to allow the passage of intake charge therethrough, again as is well known. A conventional carburetor (not shown) is fixedly mountable in counterbore 60 adjacent upstream end 56 of annular body member 52, and annular body member 52 is securable in outer boot member 54 using a conventional hose clamp (not shown), in the manner described above with reference to embodiment 32. Both annular body member 52 and annular body member 280 include an inner side wall 16 extending therethrough between an upstream end 56 and a downstream end 58 defining an intake passage 18. Each annular body member 52 and 280 also includes a plurality of orifices 94, 98, and 104, as well as lateral connecting passages 96, 100 and 106, (FIGS. 5 and 6) providing communication between intake passage 18 and an annular connecting passage 86 having an upstream end 88 and a downstream end 90, as also explained in reference to embodiment 32 above.

As noted above, annular body member 280 differs from annular body member 52 in the provision of a frusto-conical side wall surface 282 adjacent upstream end 56 thereof. Frusto-conical surface 282 is provided to enable smooth communication between intake passage 18 and open end 90 of connecting passage 86 of embodiment 32. Additionally, the juncture between frusto-conical surface 282 and the generally cylindrical side wall 16 is rounded, so as to provide favorable aerodynamic conditions in the vicinity of orifices 94 for enhancing air flow generated therein, as explained in my U.S. Pat. No. 5,386,145, the teachings of which are incorporated herein by reference. To further enhance flow induced suction in orifices 94, 98, and 104 of annular body member 280, intake passage 18 through member 280 can optionally be of slightly smaller diameter than intake passage 18 of member 52 so as to provide some restriction of flow therethrough and therefore somewhat higher air flow velocity over the orifices of member 280. Embodiment 278 will operate in the same manner as described in reference to embodiment 32 explained above, with the exception that flow through open end 90, annular connecting passage 86, and the lateral connecting passages and orifices of annular body member 280 will be more reversion driven, whereas flow through those same elements of annular body member 52 will be more intake flow driven. One important advantage of embodiment 278 is that intake flow through embodiment 32, as well as the discharge through orifices 94, 98 and 104 thereof will pass through intake passage 18 of annular member 280, and some of the flow will be cycled through that member thereby further enhancing the vaporization thereof thus producing the compounding effect discussed above. Additionally, it should be noted that the provision of two annular body members in the relationship shown can also be expected to produce a compounded induction gain.

Figure 16:
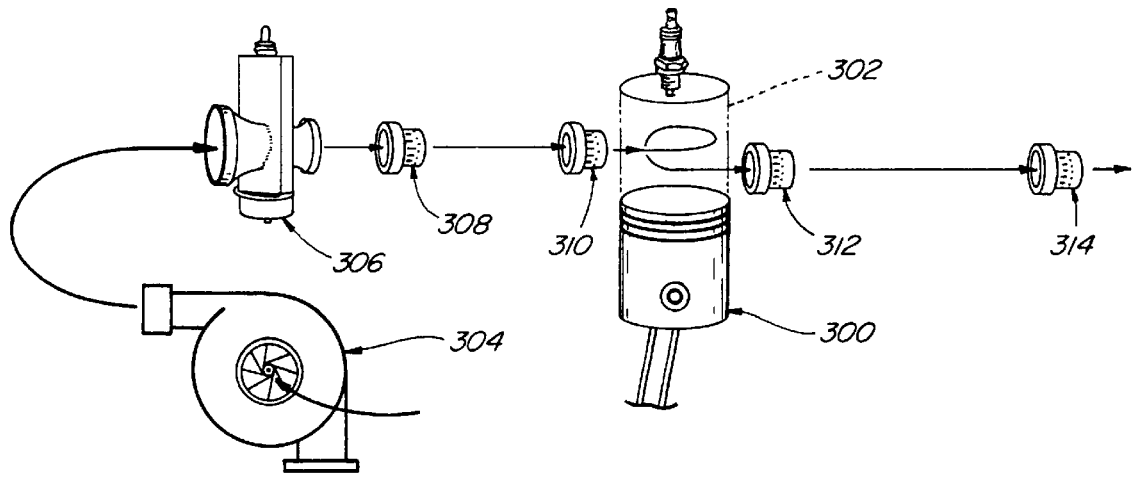
FIG. 16 is a diagrammatic representation of an internal combustion engine showing annular body members representing circuits according to the present invention placed at several possible locations in the intake and exhaust tracts of the engine, the arrows indicating the induction effect achieved thereby.

FIG. 16 is a diagrammatic representation showing the placement of apparatus according to the present invention at various locations in both the intake tract and exhaust tract of an internal combustion engine to demonstrate the improvement in induction and reversion reduction that can be achieved throughout both the intake tract and the exhaust tract. Referring to FIG. 16, induction, represented by the arrows, is generated in the conventional manner by the reciprocal movement of piston 300 in combustion chamber 302. An optional turbocharger 304 is shown at a location upstream of carburetor 306 and operates to compress or pressurize the intake flow to improve induction under certain operating conditions. Apparatus according to the present invention 308 and 310 are shown located in the intake tract, apparatus 308 being located closer to carburetor 306, while apparatus 310 is located closer to the intake port of combustion chamber 302. Similarly, in the exhaust tract, apparatus 312 is located adjacent the outlet port of combustion chamber 302, while apparatus 314 is positioned at a more downstream location closer to the exhaust outlet. In operation, apparatus 308 will function in the above described manner to vaporize intake charge flow therethrough along with raw fuel that exits carburetor 306. Also, depending on proximity to carburetor 306, the suction generated by apparatus 308 may travel upstream as far as carburetor 306 to improve induction therethrough as well as operation thereof. Apparatus 308 will also capture and redirect reversion and back pressure that travels upstream in the intake tract past apparatus 310 back into the intake flow stream.

Apparatus 310, due to its closer proximity to combustion chamber 302 will be more reversion and back pressure driven compared to apparatus 308, but will similarly improve vaporization of the intake charge, as well as cycle raw fuel, reversion and back pressure back into the intake charge flow stream. Also, the suction generated by apparatus 310 may be sufficient under some operating conditions to travel upstream sufficiently to enhance flow through apparatus 308. Apparatus 308 and 310 in combination should be sufficient to virtually eliminate reversion and back pressure from reaching carburetor 306 thereby improving operation thereof.

In the exhaust tract, exhaust flow through apparatus 312 will generate suction therein sufficient to draw raw fuel and uncombusted exhaust components back into apparatus 312 where they can be directed back into the main exhaust flow stream so as to be further combusted by proximity to the exhaust flame. Apparatus 312 can also provide sufficient vacuum to enhance evacuation of combustion chamber 302, while also capturing and preventing back pressure from entering the combustion chamber from the exhaust tract. Apparatus 314, located farther downstream, can be utilized to further reduce back pressure and also generate induction through the exhaust tract as far upstream as apparatus 312 depending on the distance between the respective apparatus. Utilizing apparatus 312 and 314, exhaust generated back pressure reaching the intake tract can be virtually eliminated. Utilizing apparatus 308–314, improved induction can be achieved throughout the intake and exhaust tracts of an engine and in the combustion chamber thereof, while reversion and its adverse effects on the intake charge as well as charge formation can be greatly reduced.

Figure 17:
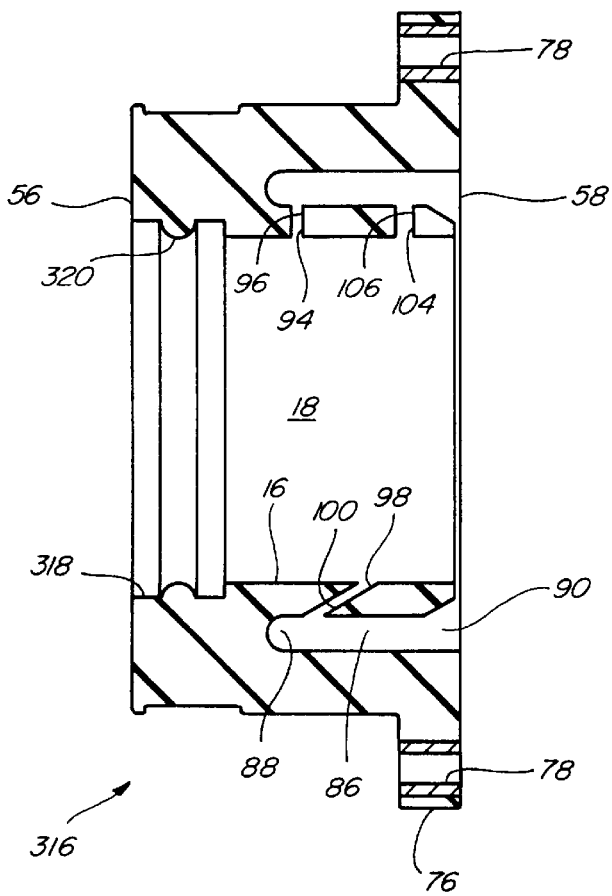
FIG. 17 is a cross-sectional view of an integrally formed embodiment according to the present invention.

FIG. 17 shows still another embodiment according to the present inventions 316, which embodiment 316 is similar to and interchangeable with embodiment 32 in the intake tract of an internal combustion engine. Embodiment 316 is similar to embodiment 32 in that it can be installed between a carburetor and cylinder head of an engine in place of the carburetor mounting boot. Embodiment 316 includes the same annular inner side wall 16 defining an intake passage 18 extending between an upstream end 56 and a downstream end 88. Embodiment 316 also forms an annular connecting passage 86 having a closed upstream end 88 and an open downstream end 90, and a plurality of radially spaced orifices 94, 98, and 104 around side wall 16, which orifices communicate with annular connecting passage 86 through lateral connecting passage 96, 100, and 106. Embodiment 316 differs from embodiment 32 in that it is integrally formed instead of being a two piece assembly. Embodiment 3 16 can be formed from any suitable material, including metal, or plastics. Upstream end 56 of embodiment 316 includes conventionally shaped and sized means for cooperatively and sealably mounting the outlet end of a carburetor thereto (not shown), including a counterbore 318 for receiving the carburetor, which counterbore 318 has an annular lip 320 therearound. A band or hose clamp (not shown) is positionable around upstream end 56 and can be tightened to secure the carburetor in position therein in the conventional manner. Embodiment 316 can be secured to an engine cylinder head using bolts inserted through holes 78 in flange 76 located adjacent downstream end 58.

In addition to the above described benefits and advantages of the present invention, other advantages are also evident. For instance, normally, in smaller engine applications, such as watercraft, motorcycle, and snowmobile applications, carburetor jets, and in cases where needle jets are used, jet size and/or needle adjustments, must be made to compensate for conditions such as altitude and temperature. However, it has been found that when the present invention is used, jet resizing and needle adjustments are much less frequently required. Also, smaller jet sizes can be used over a wider range of conditions using the present invention, resulting in an overall improvement in fuel economy. Another advantage is that embodiments of the present invention such as those discussed above can be easily incorporated into an engine with little or no modification of existing engine componentry, such as carburetor bases and boots. This advantage has particular utility for after-market applications wherein it is desired to add the present invention to an existing engine, although the simplicity of installation is also appreciated for original equipment installation.

Thus there has been shown and described a novel invention in apparatus for improving intake charge vaporization and induction for an internal combustion engine which fulfills all of the objects and advantages set forth above. It will be apparent to those skilled in the art, however, that many changes, modifications, variations and other uses and applications for the subject invention are possible. All such changes, modifications, variations, and other uses and applications which do not depart from the spirit and scope of the invention are deemed to be covered by the invention which is limited only by the claims which follow.

What is claimed is:

1. An internal combustion engine, comprising:
a charge forming device, a combustion chamber, an enclosed intake passage communicating the charge forming device with the combustion chamber, the intake passage providing a conduit for the flow of an intake charge stream from the charge forming device to the combustion chamber, the combustion chamber including structure for combusting the charge stream to produce a stream of products of combustion, a side wall defining an exhaust passage having an upstream end communicating with the combustion chamber and an opposite downstream end, the exhaust passage being adapted for receiving the stream of products of combustion from the combustion chamber through the upstream end and discharging the stream from the downstream end, a member disposed and movable for regulating flow of the stream of products of combustion from the combustion chamber to the exhaust passage, the side wall including an orifice therein positioned in communication with the exhaust passage such that the stream of products of combustion will flow over the orifice and produce suction therein towards the exhaust passage, an opening at another location positioned in communication with the exhaust passage such that back pressure in the exhaust passage generated at a location in the exhaust passage downstream of the opening and flowing towards the upstream end can enter the opening, and a connecting passage communicating the orifice with the opening, wherein suction produced in the orifice will be communicated through the connecting passage to the opening and along with any back pressure that enters the opening will cause some of the stream of products of combustion to be drawn into the opening, pass through the connecting passage and orifice and re-enter the exhaust passage along with the back pressure.

2. The engine of claim 1 wherein the orifice is located in the exhaust passage closer to the combustion chamber than the opening.

3. The engine of claim 1 wherein the opening has a downstream facing orientation with respect to the flow of the stream of products of combustion.

4. The engine of claim 1 wherein the opening extends at least substantially around the exhaust passage.

5. The engine of claim 1 comprising a plurality of the orifices.

* * * * *

UNITED STATES PATENT AND TRADEMARK OFFICE
CERTIFICATE OF CORRECTION

PATENT NO. : 6,016,655
DATED : January 25, 2000
INVENTOR(S) : George A. Boswell

It is certified that error appears in the above-identified patent and that said Letters Patent is hereby corrected as shown below:

Col. 15, line 48, "I 18" should be --118--.

Col. 23, line 39, "3 16" should be --316--.

Signed and Sealed this

Twenty-fourth Day of October, 2000

Attest:

Q. TODD DICKINSON

Attesting Officer

Director of Patents and Trademarks